United States Patent
Garmire et al.

(10) Patent No.: US 8,174,253 B2
(45) Date of Patent: May 8, 2012

(54) SYSTEMS AND METHODS THAT DETECT CHANGES IN INCIDENT OPTICAL RADIATION

(75) Inventors: Elsa Garmire, Hanover, NH (US); Ashifi Gogo, Accra (GH); Jonathan T. Bessette, Essex Junction, VT (US)

(73) Assignee: The Trustees of Dartmouth College, Hanover, NH (US)

( * ) Notice: Subject to any disclaimer, the term of this patent is extended or adjusted under 35 U.S.C. 154(b) by 0 days.

(21) Appl. No.: 13/032,523

(22) Filed: Feb. 22, 2011

(65) Prior Publication Data

US 2011/0139964 A1    Jun. 16, 2011

Related U.S. Application Data

(63) Continuation of application No. 12/165,338, filed on Jun. 30, 2008, now abandoned, which is a continuation-in-part of application No. 10/532,453, filed as application No. PCT/US03/33522 on Oct. 23, 2003, now Pat. No. 7,423,279.

(60) Provisional application No. 60/420,623, filed on Oct. 23, 2002.

(51) Int. Cl.
    *G01R 25/02* (2006.01)
(52) U.S. Cl. .......................................... 324/95
(58) Field of Classification Search .................. None
    See application file for complete search history.

(56) References Cited

U.S. PATENT DOCUMENTS

| | | | |
|---|---|---|---|
| 2,861,262 A | 11/1958 | Pankove |
| 2,959,681 A | 11/1960 | Noyce |
| 3,032,660 A | 5/1962 | Kim |
| 3,697,834 A | 10/1972 | Casey, Jr. et al. |
| 3,875,402 A | 4/1975 | Parkin |
| 3,942,898 A | 3/1976 | Anderson |
| 4,079,422 A | 3/1978 | Anagnostopoulos |
| 4,114,257 A | 9/1978 | Bellavance |
| 4,471,270 A | 9/1984 | Guyot |
| 4,576,481 A | 3/1986 | Hansen |
| 4,697,074 A | 9/1987 | Ito et al. |
| 4,767,973 A | 8/1988 | Jacobsen et al. |
| 4,863,270 A | 9/1989 | Spillman, Jr. |
| 4,885,622 A | 12/1989 | Uchiyama et al. |
| 4,935,618 A | 6/1990 | Naito |
| 5,406,067 A | 4/1995 | Keller |

(Continued)

FOREIGN PATENT DOCUMENTS

EP    0359360    3/1990
(Continued)

OTHER PUBLICATIONS

Jones, B.K. & McPherson, M., Radiation damaged silicon as a semi-insulating relaxation semiconductor: static electrical properties: Semicond. Sci. Technol. 14 (1999) pp. 667-678.

(Continued)

*Primary Examiner* — Jermele M Hollington
(74) *Attorney, Agent, or Firm* — Lathrop & Gage LLP

(57) ABSTRACT

Systems, methods and sensors detect changes in incident optical radiation. Voltage is applied across one or more active areas of a detector while the incident optical radiation illuminates the active areas. Current is sensed across one or more of the active areas, a change in the current being indicative of the changes in incident optical radiation.

33 Claims, 21 Drawing Sheets

U.S. PATENT DOCUMENTS

| | | | |
|---|---|---|---|
| 5,430,546 | A | 7/1995 | Huber |
| 5,548,420 | A | 8/1996 | Koshimiza et al. |
| 5,614,708 | A | 3/1997 | Koishi et al. |
| 5,670,777 | A | 9/1997 | Inushima et al. |
| 5,793,357 | A | 8/1998 | Ivey et al. |
| 6,075,251 | A | 6/2000 | Chow et al. |
| 6,201,234 | B1 | 3/2001 | Chow et al. |
| 6,242,740 | B1 | 6/2001 | Luukanen et al. |
| 6,465,784 | B1 | 10/2002 | Kimata |
| 7,423,279 | B2 | 9/2008 | Heinz et al. |
| 7,911,015 | B2 * | 3/2011 | Sugino .......................... 257/431 |
| 7,947,939 | B2 * | 5/2011 | Schrey et al. .............. 250/208.1 |
| 2003/0035111 | A1 | 2/2003 | Nevis |
| 2006/0156822 | A1 | 7/2006 | Heinz et al. |
| 2007/0041729 | A1 | 2/2007 | Heinz et al. |
| 2008/0258044 | A1 * | 10/2008 | Schrey et al. .............. 250/208.1 |

FOREIGN PATENT DOCUMENTS

| | | |
|---|---|---|
| EP | 0903566 | 3/1999 |
| EP | 1041371 | 10/2000 |
| GB | 2272763 | 5/1994 |
| JP | 60196676 | 10/1985 |
| WO | WO2004038325 | 5/2004 |

OTHER PUBLICATIONS

PCT/US03/33522 International Search Report mailed May 7, 2004; 3 pages.

PCT/US03/33522 International Preliminary Report Examination Report & Written Opinion; Nov. 17, 2004; 11 pages.

PCT/US07/067654 International Search Report mailed May 7, 2004; 3 pages mailed Sep. 20, 2007; 2 pages.

PCT/US07/067654 Written Opinion mailed May 7, 2004; 3 pages mailed Sep. 20, 2007; 8 pages.

U.S Appl. No. 10/532,453.

U.S. Appl. No. 11/413,463 Office Action mailed Sep. 11, 2007; 11 pages.

U.S. Appl. No. 11/413,463 Notice of Abandonment mailed Mar. 25, 2008; 2 pages.

Select File History from related U.S. Appl. No. 12/165,338 from May 12, 2010 to Oct. 20, 2010.

\* cited by examiner

SYSTEMS AND METHODS THAT DETECT CHANGES IN INCIDENT OPTICAL RADIATION

RELATED APPLICATIONS

This application is a continuation of U.S. patent application Ser. No. 12/165,338 filed Jun. 30, 2008 now abandoned, which is a continuation-in-part of U.S. patent application Ser. No. 10/532,453 filed 22 Apr. 2005 now U.S. Pat. No. 7,423, 279, which is the U.S. national stage entry of PCT application serial number PCT/US03/33522 filed 23 Oct. 2003, which claims priority to U.S. provisional application Ser. No. 60/420,623, filed 23 Oct. 2002. Each of the aforementioned applications are hereby incorporated by reference.

BACKGROUND

Examining surface displacement (e.g., vibration) of an object or surface with optical radiation has advantages in many settings, for example in high-temperature or vacuum conditions where physical contact with the object or surface could easily damage expensive equipment or disrupt the desired vacuum conditions. In another example, it is advantageous to perform contactless, nondestructive testing of structural members or mechanical components, for example for ultrasonic movement of the members or components, or to search for defects. Among various techniques proposed to exploit these advantages, techniques that employ the Fabry-Perot interferometer, the photo-emf effect or photorefractive crystals appear most promising, largely due to their ability to detect nanometer-scale vibrations of rough surfaces in the presence of speckle (speckle is created when the surface under investigation is optically rough, such that laser illumination of the surface and collection of backscatter results in speckle). Nonetheless, each of these techniques also requires "referencing," which utilizes signal and reference beams from the same wavefronts during direct interferometric detection; for practical applications, this referencing requires additional optical components that often misalign while detecting intensity changes or speckle patterns in the optical radiation, particularly in the presence of mechanical vibration or movement. Misalignment may cause critical failures, because altering the angular relationship between signal and reference beams also changes the grating spacing on the detector. Prior art techniques (for example utilizing the photo-emf effect) are very sensitive to operating at precisely the right grating spacing.

Prior art devices that measure speckle patterns or changes in incidental optical radiation also utilize the power in the optical radiation to drive the output signal. Such devices are problematic because, for example, the power available to these devices is dependent on the detecting area; the electronic output depends on the detecting area so that scaling the device to smaller size results in lower output. Among other drawbacks, this impedes vibration detection since the detecting area must be smaller than the speckle size to avoid signal attenuation and to avoid averaging of variations across the sensing element.

Prior art optical detectors are also problematic whenever a small detecting area is needed and the intensity of the optical radiation is weak. For example, in such situations, photodiodes and photodiode arrays generate very small currents, from micro-amps to nano-amps, that are very hard to measure; they also generate signals that are significantly impacted by noise and interference. Improvements to optical detectors are therefore needed.

SUMMARY OF THE INVENTION

Certain optical radiation detectors described herein below are useful in the measurement of time-varying optical radiation. The detectors may provide a voltage or current output that is less sensitive to electromagnetic interference as compared to optical detectors of the prior art.

In one embodiment, an optical sensor has a detector made of photoconductive material; the photoconductive material's photoconductivity depends on the intensity of the incident optical radiation. The sensor may employ one of three alternative methods to measure change in the intensity: in the first method, the sensor applies a constant voltage across the detector and measures the current change through one or more active areas of the photoconductive material; in the second method, the sensor applies a constant voltage across the detector so that one or more active areas of the detector form a voltage divider, wherein the distribution of voltage drops across the active areas then depends on illumination by the incident optical radiation. The second method may also employ a fixed resistance connected in series with the active areas, to form the voltage divider. In the third method, the applied voltage or current is modulated by a square wave or other waveform (e.g., a periodic modulation such as a sine wave). Selective amplification at the frequency of the modulation may help to achieve higher signal-to-noise ratios.

In one exemplary use of the optical sensor, a four-point measurement is made in which current is sourced and sunk through two contacts to the photoconductive material; and the voltage drop is observed across an illuminated active area formed by two additional contacts placed between, and collinear with, the two current source/sink contacts. Additional active areas may be formed by adding additional contacts between the current source/sink contacts. One exemplary optical sensor employs four active areas fabricated with semi-insulating gallium arsenide (GaAs), though other detector materials may be employed.

The optical sensor may be used to detect vibrations and surface displacements by observing the changes in interference or speckle patterns due to surface motion (e.g., continuous or transient surface motion with amplitudes of the order of nanometers, or higher). This detection is for example useful to assess mechanical resonances and ultrasonic waves associated with non-destructive testing. When the detector has an array of active areas, as opposed to a single point detector element, signal processing electronics may average the output of the individual active areas to provide a large and observable signal, without the need for nonlinear phase-compensating elements of the prior art. Accordingly, laser light scattered off an optically rough surface forms the speckle pattern that reconfigures and/or moves laterally as the surface displaces, either due to a mechanical resonance or due to an ultrasonic wave. As the speckle pattern moves, local variations in optical intensity are detected by the optical sensor.

Certain advantages may be realized by the optical sensor. First, an external current or voltage source powers the detector, which then uses optical power from the incident radiation to modulate the constant current with information content. The incident optical radiation is therefore not used as the power source to drive the signal, as in certain devices of the prior art. The same advantage is obtained when using the detector with a voltage source. Second, the optical sensor may be scaled to small size (e.g., in the micrometer range) since the photoconductivity of the photoconductive material depends on the detector's aspect ratio rather than on total surface area. This allows for detection over a single speckle, making it possible to reduce dimensions of the optical arrangement illuminating the surface to a portable unit (e.g., a unit employing optical fiber). Third, by using the four-point measurement, a voltage output is produced that is compatible with observation instruments such as an electronic scope or spectrum analyzer. The voltage output is for example millivolts, compared to nanoamps to microamps generated by photodiodes used in comparable applications.

The optical sensor may have various applications, and may be conveniently employed with known systems that generate ultrasonic waves in objects. By way of example, it may be used with laser-based ultrasound to measure sample thicknesses or to detect defects. In this example, a pulse laser generates a high-power pulse (e.g., a pulse with megawatts of power and with nanoseconds of illumination) on the surface of the sample to generate ultrasonic waves in the sample. A separate detection laser (e.g., a HeNe laser) then illuminates the sample and the optical sensor detects changes in optical radiation reflected off of the surface. In another example, piezoelectric transducers generate the ultrasonic waves in the object; the detection laser and optical sensor are then used to non-destructively test the object (e.g., for defects or object thickness).

The optical sensor may also be used within manufacturing (e.g., for quality assurance issues), for example, or within transportation (e.g., for safety issues). Non-destructive testing in manufacturing, for example, enables quality control by detecting defects (e.g., cracks and inclusions in finished products). Another application for the optical sensor is within metal processing, where continuity checks of thin sheet goods can be made by detecting Lamb waves. Yet another application for the optical sensor is the determination of how many balls are in a bearing. In transportation, the optical sensor may be deployed in the detection of cracks, inclusions or other defects in solid objects, such as railroad tracks, wheels, axles, wings, hulls or other components of trains, cars, trucks, ships or aircraft. In civil engineering, the optical sensor may be employed in integrity tests of steel girders, bridges, or similar structural components. Misalignments due to earthquakes, ground shifting or structural weaknesses can also be monitored through use of the optical sensor. In medical applications, the optical sensor may be deployed, for example, in the detection of cavities in teeth.

In addition to ultrasonic testing, the optical sensor may be used at lower frequencies, to measure vibrations (e.g., audible or sub-sonic vibrations). For example, the optical sensor may enhance security applications by remotely monitoring conversations through vibrating windows of a building or by determining whether activity exists within a vehicle through vibrations of the vehicle.

Because the detector of the optical sensor may be scaled in size to be compatible with multi- and single-mode optical fibers, the optical sensor may also be used when illumination is provided by fibers. Accordingly, when vibration of a surface hidden from view needs to be monitored, the detector and optical fibers may be disposed in hard to reach locations that heretofore were inaccessible. In one example, detection of cavities in teeth may require fiber illumination.

Fibers may also be employed within certain communications systems, and so the optical sensor may have application within communications. For example, by placing the active area of the detector onto an optical fiber, with its area matched to that of a single mode fiber, changes in optical radiation from the fiber may be detected. If the detector employs an array of active areas, the optical sensor may also be employed with fiber arrays, for LED-driven parallel systems. An optical sensor employing the arrayed detector may also be used to sense higher-order Gaussian beams in free-space communications systems.

The detector may employ a two-dimensional array of active areas, to facilitate optical imaging. In one example, the arrayed detector may be used as a type of spatial filter, for example to facilitate precision alignment of machinery. Other arrayed detectors may be used in tracking, as a navigation aid for ships, aircraft, or missiles, or as a motion sensor, detecting, for example, intruders.

In measurements of vibration, the optical sensor may be used in a "referenceless" configuration, since it does not require direct interferometric detection. It may also operate without significant optical alignment. These benefits occur because the optical detector can be made very small and used with an array of active areas; the optical sensor lends itself to use in referenceless experimental setups that do not depend on direct interferometric detection.

In one embodiment, a method detects changes in incident optical radiation. Voltage is applied across one or more active areas of a detector while the incident optical radiation illuminates the active areas. Voltage is sensed across or current is sensed through one or more of the active areas, a change in the voltage or current being indicative of the changes in incident optical radiation.

In another embodiment, a method determines surface motion, including: illuminating a surface with a laser having a wavelength that is smaller than defined geometric features of the surface; and detecting moving speckle indicative of surface motion by: applying voltage to one or more active areas of a detector while the moving speckle illuminates the active areas; sensing current through or voltage across one or more of the active areas to detect the surface motion.

In one embodiment, a method determines surface motion, including: generating an interference pattern that varies with surface motion; and detecting the interference pattern by: applying voltage to one or more active areas of a detector while the interference pattern illuminates the active areas; and sensing current through or voltage across one or more of the active areas to detect the surface motion.

In one embodiment, a sensor detects changes in incident optical radiation. A detector has one or more active areas formed of photoconductive material. A voltage is applied across each of the active areas. Electronics measure the current coming from each area, the current change being indicative of the changes in incident optical radiation.

In one embodiment, an optical radiation detector is provided. The detector has photoconductive material forming one or more active areas. Input electrodes provide a voltage source, to drive current through the active areas. Output electrodes provide for connection to an observation instrument, to sense current changes across one or more of the active areas.

In one embodiment, a method aligns two objects, including: generating an interference pattern dependent upon a distance between the two objects; and sensing changes in the interference pattern to achieve optimal alignment between the objects by: applying voltage across one or more active areas of a detector while the interference pattern illuminates the active areas; and sensing current through one or more of the active areas, a change in the current being indicative of a change in the distance between the objects.

In one embodiment, a detector for detecting changes in incident optical radiation includes an insulating substrate having a first surface and a first photoconductive active area, formed on the first surface of the insulating substrate, for detecting the incident optical radiation. The first active area is formed of a group IV semiconductor. The detector further includes a first and a second electrical contact both electrically coupled to the first active area.

In one embodiment, a sensor for detecting a change in incident optical radiation includes a detector. The detector includes an insulating substrate including a layer of silicon and a layer of silicon dioxide formed on the silicon layer. An upper surface of the silicon dioxide layer opposite to the silicon layer forms a first surface. The detector further includes a first photoconductive active area, for detecting the incident optical radiation, formed on the first surface. The first active area is formed of silicon. The detector additionally includes a first and a second electrical contact both electrically coupled to the first active area for driving an electrical current from a current source through the first active area. The sensor further includes electronics for measuring a change in current or voltage across the first active area to determine the change in the incident optical radiation.

In one embodiment, a sensor for detecting a change in incident optical radiation includes a detector. The detector includes an insulating substrate including a layer of silicon and a layer of silicon dioxide formed on the silicon layer. An upper surface of the silicon dioxide layer opposite to the silicon layer forms a first surface. The detector further includes a photoconductive active area, for detecting the incident optical radiation, formed on the first surface of the insulating substrate. The active area is formed of silicon. The detector additionally includes a first and a second electrical contact both electrically coupled to the active area, for applying a voltage from a voltage source across the active area. The sensor further includes a load resistor electrically connected in series with the active area and electronics for measuring a change in voltage across the load resistor, the change in voltage being indicative of the change in the incident optical radiation.

In one embodiment, a method for detecting a change in optical radiation includes applying a voltage across a first photoconductive active area formed of silicon on a first surface of an insulating substrate while the optical radiation illuminates the first active area. The insulating substrate includes a layer of silicon and a layer of silicon dioxide formed on the silicon layer. An upper surface of the silicon dioxide layer opposite to the silicon layer forms the first surface. The method further includes measuring a current change across the first active area, the current change being indicative of the change in the optical radiation.

In one embodiment, a method for detecting a change in optical radiation includes applying a voltage across a first photoconductive active area formed of silicon on a first surface of an insulating substrate, while the optical radiation illuminates the first active area. The insulating substrate includes a layer of silicon and a layer of silicon dioxide formed on the silicon layer. An upper surface of the silicon dioxide layer opposite to the silicon layer forms the first surface. The method further includes measuring a voltage change across a first load resistor electrically connected in series with the first active area, the voltage change across the first load resistor being indicative of the change in the optical radiation.

DETAILED DESCRIPTION OF ILLUSTRATED EMBODIMENTS

Figure 1:
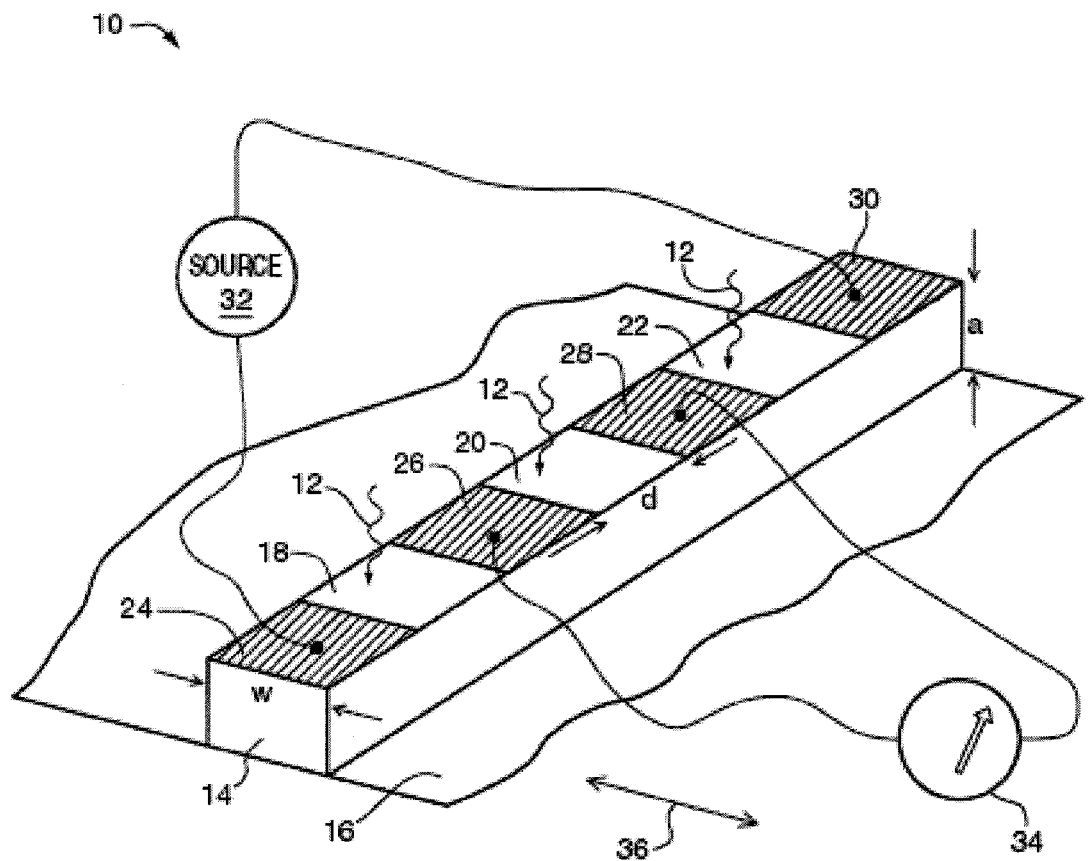
FIG. 1 illustrates one optical sensor for detecting changes in incident optical radiation, according to an embodiment.

It is noted that, for purposes of illustrative clarity, certain elements in the drawings may not be drawn to scale. Specific instances of an item may be referred to by use of a numeral in parentheses (e.g., detector 300(1)) while numerals without parentheses refer to any such item (e.g., detectors 300).

FIG. 1 shows an optical sensor 10 that detects intensity changes in optical radiation 12 incident on its detector 14, through a four-point measurement. Detector 14 is formed (e.g., etched) from a photoconductive substrate 16 and includes one or more photosensitive regions (active areas) 20, and an array of connectivity points (electrodes, or contacts) 24, 26, 28, 30. A source 32 connects to outer two connectivity points 24, 30, to power detector 14; and an observation instrument 34 measures voltage across two inner connectivity points 26, 28, as shown. Source 32 is for example a direct current source, a voltage source, or a source that applies time-varying current or voltage to detector 14. Observation instrument 34 is for example an electronic oscilloscope that monitors a resulting time-varying voltage signal from inner connectivity points 26, 28, indicating time-varying change of intensity in incident radiation 12 on active area 20. By analyzing this time-varying signal on a frequency basis (e.g., through use of a spectrum analyzer as observation instrument 34), frequency-dominant voltage signals may be isolated to indicate modulation of the incident optical radiation 12 (for example caused by vibrating surfaces interacting with or reflecting optical radiation 12 at ultrasonic frequencies).

Detector 14 is also shown with two other active areas 18 and 22, which are used in the four-point measurement, but which are not used to detect radiation 12 for detector 14. If detector 14 were made without active areas 18, 22 (that is, active areas 18, 22 were not present), the injected current to detector 14 would flow through electrodes 26, 28, used for the four-point measurement; and the four-point measurement would instead depend on the physical characteristics of electrodes 26, 28. With the four-point measurement as in FIG. 1, current does not flow through electrodes 26 and 28, so that the four-point measurement is independent of contact characteristics. This is useful because it is frequently difficult to form high-quality contacts on many materials. Accordingly, active areas 18, 22 are not used as actual sensing elements for detector 14 in the configuration of FIG. 1. Upon reading and fully comprehending this disclosure, those skilled in the art thus appreciate that active areas 18, 22 may be formed of semiconducting or resistive material to provide like function (i.e., to provide current flow through active area 20, from source 34). Moreover, if contacts 24, 26, 28, 30 have sufficiently high quality, it is possible that detector 14 function in like manner without active areas 18, 22 (that is, contacts 24, 26 are adjacent one another and not spaced apart by element 18, and contacts 28, 30 are adjacent one another and not spaced apart by element 22).

If source 32 is a constant voltage source, then the voltage drop across active areas 18, 22 may be taken into account. Specifically, if illumination of active area 20 changes, the voltage drop will change if there is a differing intensity change incident on active areas 18, 22 as compared to active area 20. Accordingly, there may be a situation where detection is nullified, though rare in occurrence. For example, if active areas 18, 22 are "dark" (not illuminated), the voltage drop across active area 20 accurately detects changes in incident optical radiation 12. Accordingly, in one embodiment, a mask (not shown) covers active areas 18, 22 such that they are dark, but the dimensions of areas 18 and 22 are chosen such that they still carry current from source electrode 24 to drain electrode 30. Preferably, the dark conductivity of regions 18, 22 is high enough that they are not highly resistive. Active areas 18, 22 may also be made very thin to enable current flow through relatively high resistivity material. This will also reduce problems associated with illumination of regions 18, 22. Keeping active areas 18, 22 in the dark by a mask or other means may thus depend upon the material and geometry used to provide one solution ensuring a variation in voltage drop across active area 20 is proportional to its illumination.

As intensity of incident radiation 12 varies, the photoconductance S of material between connectivity points 26, 28 is determinable. As in Equation 1 below, photoconductance S depends on the active area's aspect ratio (width w divided by length d) for a given absorption depth a, such that detector 14 may be scaled down to the desired small size without loss of signal:

$$S = \sigma a \frac{w}{d} \qquad \text{(Equation 1)}$$

σ stands for conductivity, which depends on the carrier concentration generated by incident optical radiation 12. The carrier concentration depends on the intensity of incident radiation 12, rather than the total power absorbed, so that photosensitive regions 18, 20, 22 may be sized to fit within a desired grating spacing (or to some other desired dimension, such as to correspond to speckle size). The arrangement of electrodes 24, 26, 28, may be chosen so as to prevent diffusion of charge carriers out of detector 14. This can be achieved, for example, by selecting width w to be typically at most one diffusion length wide (dimension w), while depth a is typically at least one diffusion length deep (dimension a). This ensures that photogenerated charge carriers will recombine before they can contribute to conductivity outside the region of interest.

With regard to active areas 18, 22, width w and length d need not be the same as active area 20. In one embodiment, for example, width w and length d for active areas 18, 22 are chosen (e.g., via doping density of the photoconductive material) so that current flows through active area 20, but also such that there is no short-circuit between electrodes 24, 26 and 28, 30, respectively.

The photoconductive area forming active area 20 is for example a semiconductor. For example, the photoconductive material may comprise either a III-V semiconductor or a II-VI semiconductor. A III-V semiconductor is defined by one or more components of the composition from the III column of the periodic table, and one or more components of the composition from the V column. A II-VI semiconductor is defined by one or more components of the composition from the II column of the periodic table, and one or more components of the composition from the VI column.

Figure 2:
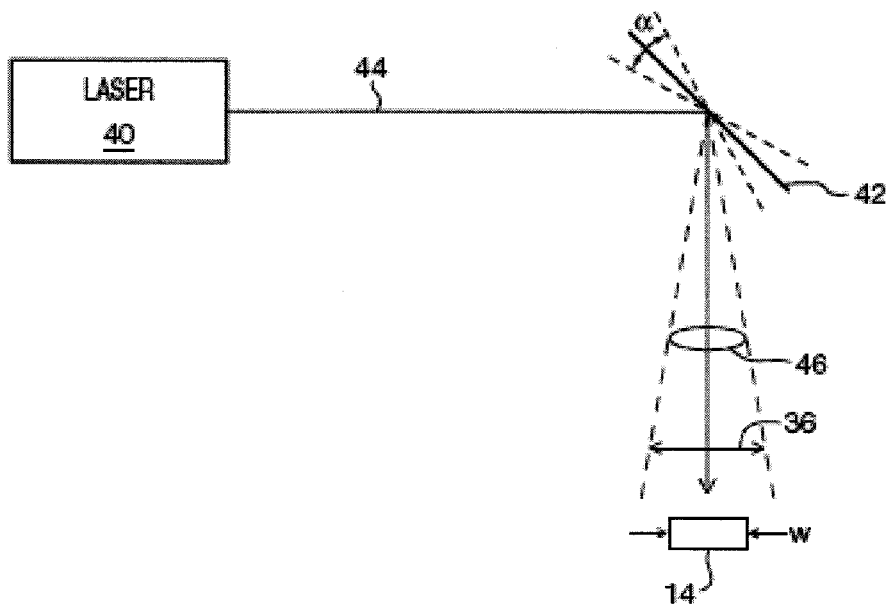
FIG. 2 shows an illustrative illumination set-up that generates incident optical radiation with time-varying intensity.

Note that the variation of intensity in incident optical radiation 12 may occur through cyclical (e.g., periodic) motion of optical radiation 12 back and forth across detector 14, along a direction 36, and typically at one or more dominant frequencies. The variation in intensity may also occur through transient motion of optical radiation 12 across detector 14, along direction 36. Direction 36 is shown illustratively; however the cyclical or transient motion of optical radiation 12 may occur in any orientation relative to detector 14. FIG. 2 illustratively shows how the cyclical or transient motion may occur. A laser 40 illuminates a surface 42 (with a laser beam 44) that tilts through an angle α (or that displaces parallel or perpendicular to surface 42) due to vibration or transient displacement of surface 42; this vibration typically occurs with peak energies at resonant or dominant frequencies. Backscattered radiation 46 from laser beam 44 illuminates detector 14 with a time-varying intensity pattern along direction 36 (also at the dominant frequencies, in the case of cyclical motion of optical radiation 12 back and forth across detector 14). Backscattered radiation 46 may include speckle when surface 42 is optically rough in comparison to the wavelength of laser beam 44 (that is, the wavelength is much smaller than defined geometric features of surface 42). If surface area wd of active area 20 corresponds in size to an average speckle, then one active area 20 may detect that speckle. Laser 40 is for example an Argon laser emitting a laser beam 44 at about 488 nm.

By sensing voltage drop across active area 20, sensor 10 produces time-varying voltage that may be analyzed in the time domain or in the frequency domain. Accordingly, it should therefore be clear that detector 14 monitors both periodic and transient motion of optical radiation 12 across detector 14 (for example, along direction 36). Periodic motion may relate to resonant behavior (e.g., vibration) of a surface which reflects radiation 12 to detector 14, for example, while transient motion may for example relate to ultrasonic testing. Hereinafter, periodic and transient motions may be collectively denoted as "motion."

Figure 3:
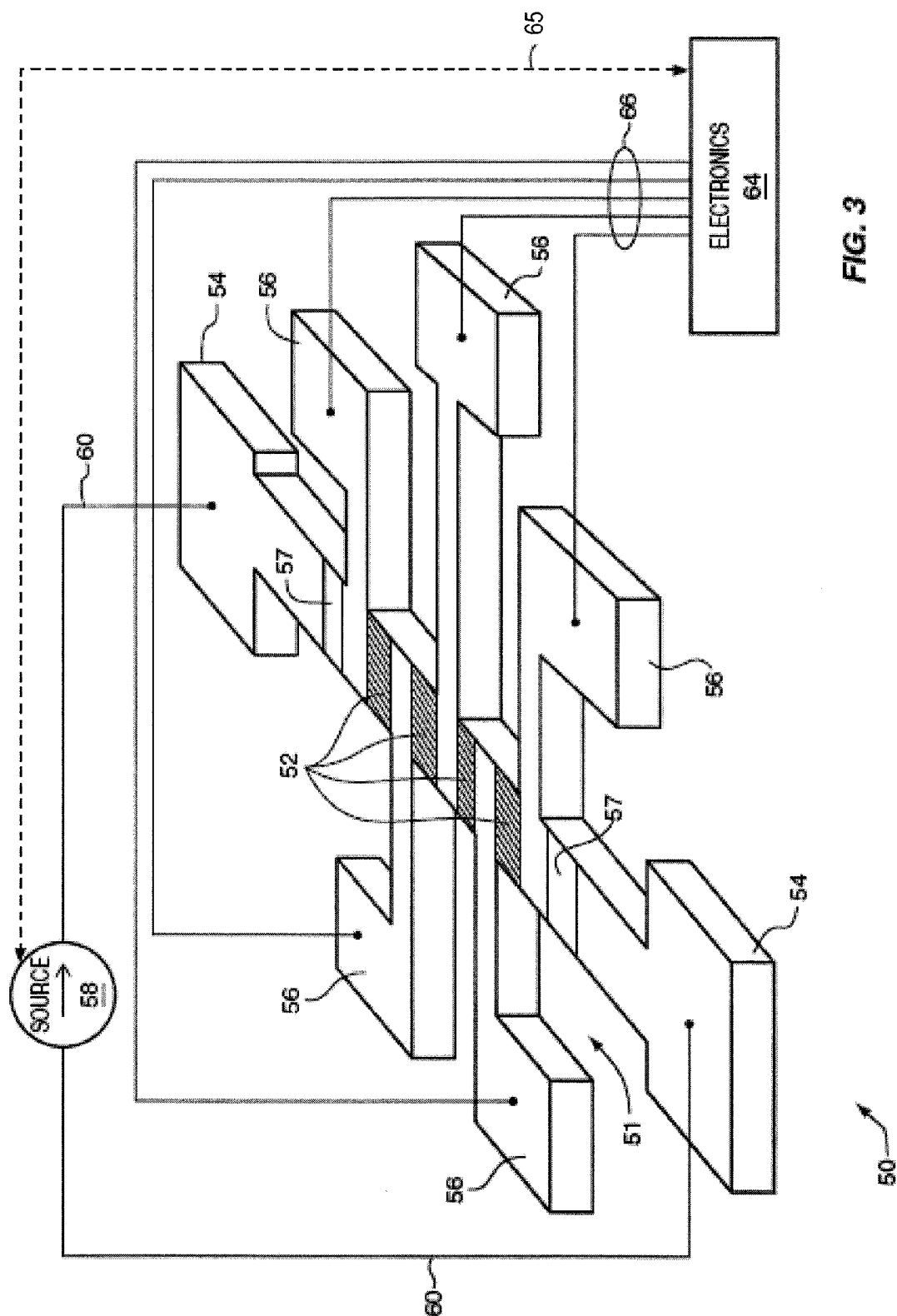
FIG. 3 shows a schematic illustration of one optical sensor for detecting changes in incident optical radiation, according to an embodiment.

To increase confidence of detection, to add detection redundancy, to exploit spatial characteristics of illumination, and/or to provide other features as a matter of design choice (such as to provide imaging functionality), additional active areas may be incorporated into detector 14, such as shown in FIG. 3. In FIG. 3, an optical sensor 50 has a detector 51 with four active areas 52, two input connectivity electrodes 54, and five output connectivity electrodes 56. A current source 58 powers sensor 50 through electrical connections 60 to outer electrodes 54. The voltage drop across each active area 52 is measured by electronics 64 (e.g., an observation instrument 34, FIG. 1), which connects to output electrodes 56 through electrical connections 66 as shown. A semiconducting material 57 separates electrodes 54 from electrodes 56 so that only characteristics of active areas 52 are measured by electronics 54 (for example, semiconducting material 57 comprises the same photoconductive substrate forming active areas 52, similar in function to areas 18, 22 of FIG. 1). With an optical sensor 50 such as shown, each active area 52 may be used to detect an individual speckle such as described in connection with FIG. 2, providing high confidence in actual detection. Signals from active areas 52 may be averaged to increase the signal-to-noise ratio.

Although four active areas 52 are shown in FIG. 3, it should be apparent that additional or fewer active areas 52 may be incorporated into detector 51 as a matter of design choice.

It should also be clear from FIG. 3 that the configuration of active areas 52 may also be chosen to detect an interference pattern with a known (or expected) spacing between constructive and destructive fringes, such that at least one active area 52 is assured to fit within one spatial period of the pattern. By including multiple active areas 52, the requirements for optical alignment of the system that generates the interference pattern are less stringent, since any one of areas 52 may be used to detect intensity changes in the pattern.

In one embodiment, electronics 64 includes a controller (or computer) that also controls modulation of source 58 (e.g., through a control line 65). By modulating injected current or applied voltage to detector 51, selective amplification of the output of sensor 50 at the modulation frequency may be employed to assist in reducing noise. Electronics 64 may also monitor signals of source 58 through control line 65, as a matter of design choice.

A prototype of detector 51 was fabricated in semi-insulating GaAs. Prototype detector 51 was fabricated by etching bulk material away from an underlying substrate (e.g., substrate 16, FIG. 1). Electrodes 54, 56 were deposited onto detector 51 to form four collinear active regions 52 of dimensions 40×100 μm (for dimensions wd). The driving current from source 58 was approximately two microamperes.

Experiment 1

Figure 4:
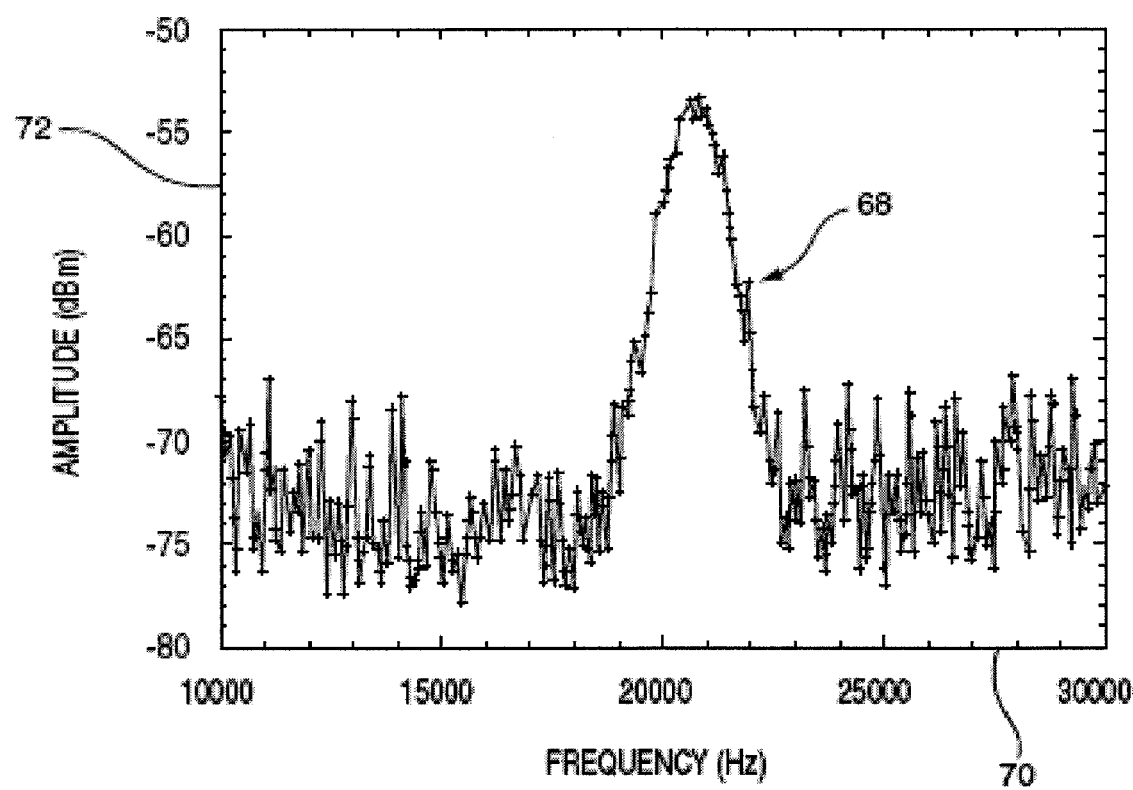
FIG. 4 graphically shows the signal output from one experimental sensor, indicating detection of a lateral speckle pattern displacement.

The prototype detector 51 was also tested experimentally, by mounting prototype detector 51 within in a dual-inline-package header that connected to electronics 64. Electronics 64 (in this experimental example) amplified the potential difference across each active region 52 and then summed the positive signals from all active regions 52. In order to demonstrate remote measurement of vibrations, an argon laser beam of wavelength λ=488 nm was slightly focused upon a white piece of paper, mounted taut in front of a high-frequency loudspeaker, to a spot size of about D=0.6 mm diameter. The surface normal to the paper was arranged to form 45-degree angles with both the laser beam and a surface normal of detector 51. The laser beam propagated at 90 degrees with respect to the surface normal of detector 51, much like the configuration shown in FIG. 2 (with the paper forming surface 42, and the experimental prototype detector 51 positioned at detector 14 in FIG. 2). The distance from the illuminated spot to detector 51 was approximately L=5 cm. Using $$d = 1.2\frac{\lambda L}{D} \quad \text{(Equation 2)}$$

as an estimate for the average size of a speckle gives an approximate speckle size d≈50 μm, comparable to the dimensions of the prototype sensing element 52 (40×100 μm). Application of a sinusoidal driving voltage to the loudspeaker caused vibrations of the paper, resulting in lateral and cyclical displacement of the speckle pattern on detector 51 (e.g., back and forth motion 36 over detector 14, FIG. 1). This in turn caused cyclical variations in sensed voltage from prototype detector 51. Using a spectrum analyzer as electronics 64, the voltage signal at a dominant frequency 68 was clearly visible, as shown in FIG. 4 (x-axis 70 shows frequency while y-axis 72 shows signal amplitude from prototype detector 51). Dominant frequency 68, which is 20 kHz, is borderline ultrasonic. In this case, vibrations of the whole object (paper) were detected, as opposed to detecting ultrasonic waves in a solid. Different experiments were performed to prove that prototype detector 51 works for ultrasonic frequencies.

Experiment 2

Figure 5:
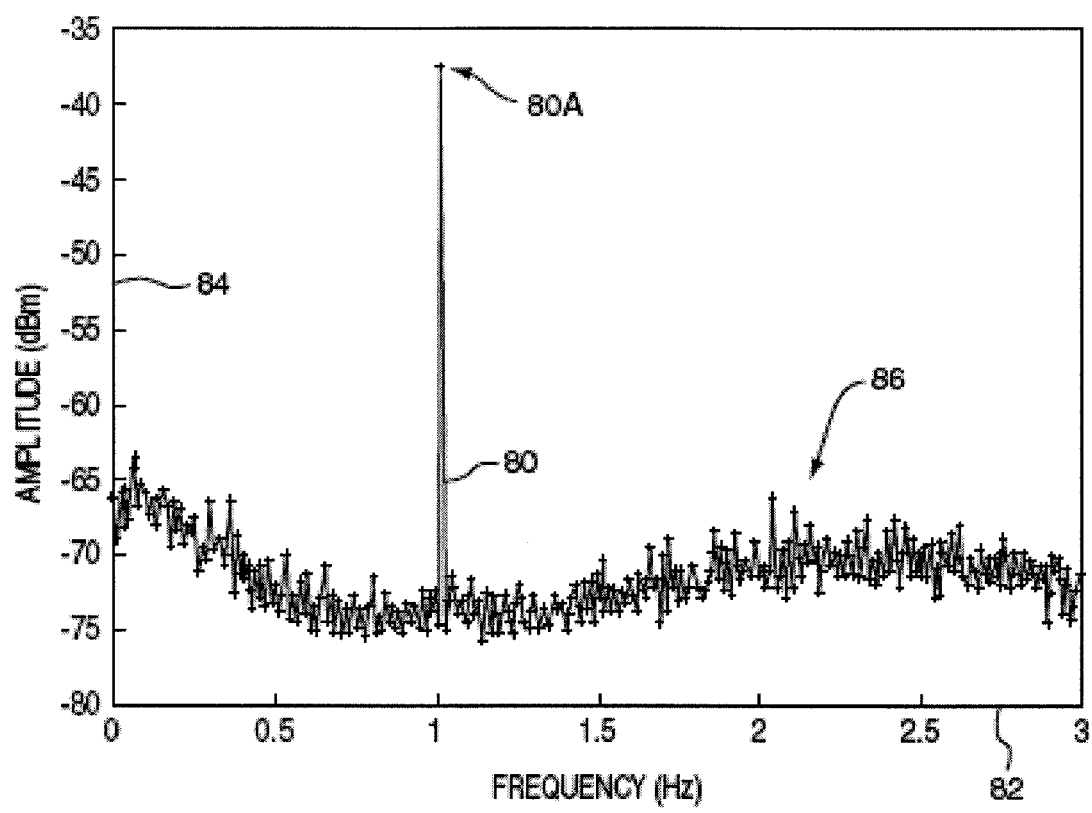
FIG. 5 graphically shows the signal output from the experimental sensor, indicating detection from an electro-optic modulator operating at one megahertz.

Another experiment was conducted with prototype detector 51. A LiNbO3 electro-optic modulator was placed between a polarizer-analyzer pair; the input polarizer's transmission axis was oriented so as to ensure that light entering the modulator has polarization components along both optical axes. The electrodes of the modulator were not aligned parallel to the principal optical axes of the crystal, so that an applied voltage has different effects on the refractive indices along both axes (which have different electro-optical coefficients). A relative phase difference between the two polarization components is therefore induced, and application of a periodically varying voltage leads to a periodically varying amplitude past the analyzer. Under illumination by a helium-neon laser of wavelength λ=632.8 nm, a clear output signal was observed on the spectrum analyzer for a sinusoidal voltage of frequency 1 MHz applied to the electro-optic modulator, with an average incident intensity of 0.15 mW/cm2 and an intensity modulation depth of m=0.6. The resulting frequency dominant output signal 80 is shown in FIG. 5. In FIG. 5, x-axis 82 shows frequency while y-axis 84 shows signal amplitude from prototype detector 51. The peak 80A of signal 80 corresponded to the modulation frequency of 1 MHz and is clearly visible, rising about 30 dB above the noise floor 86. This ratio may be improved further, for example, by suppressing the slight gain peaking of the amplifying circuit to achieve a flat frequency response.

Other experiments were performed at frequencies important in ultrasonic testing, from hundreds of kilohertz up to 2 MHz, to determine the sensitivity of the prototype detector 51. At 1 MHz, reducing the modulation depth to m=0.2 reduced the observed peak to −50 dBm, and a further reduction to m=0.05 led to a further decrease to −60 dBm. Accordingly, even for these lower modulation depths, the prototype optical sensor 50 successfully produced a clear output signal, rising 15 to 25 dB above the noise floor.

Embodiments of a detector, which may be used in an optical sensor, include a photoconductive active area formed of a group IV semiconductor, which is formed on an insulating substrate. The group IV semiconductor includes one or more elements of the IV column of the periodic table. Such detectors, for example, are formed from a silicon on insulator ("SOI") wafer including two layers of silicon and a layer of silicon dioxide disposed therebetween. Detectors including active areas formed of a group IV semiconductor may advantageously offer fast response times. For example, a detector with an active area formed of silicon on a silicon dioxide surface may realize submicrosecond response times. Such response times, for example, may allow the detector to be used in measuring ultrasonic vibrations by detecting changes in optical radiation resulting from such vibrations.

Figure 6:
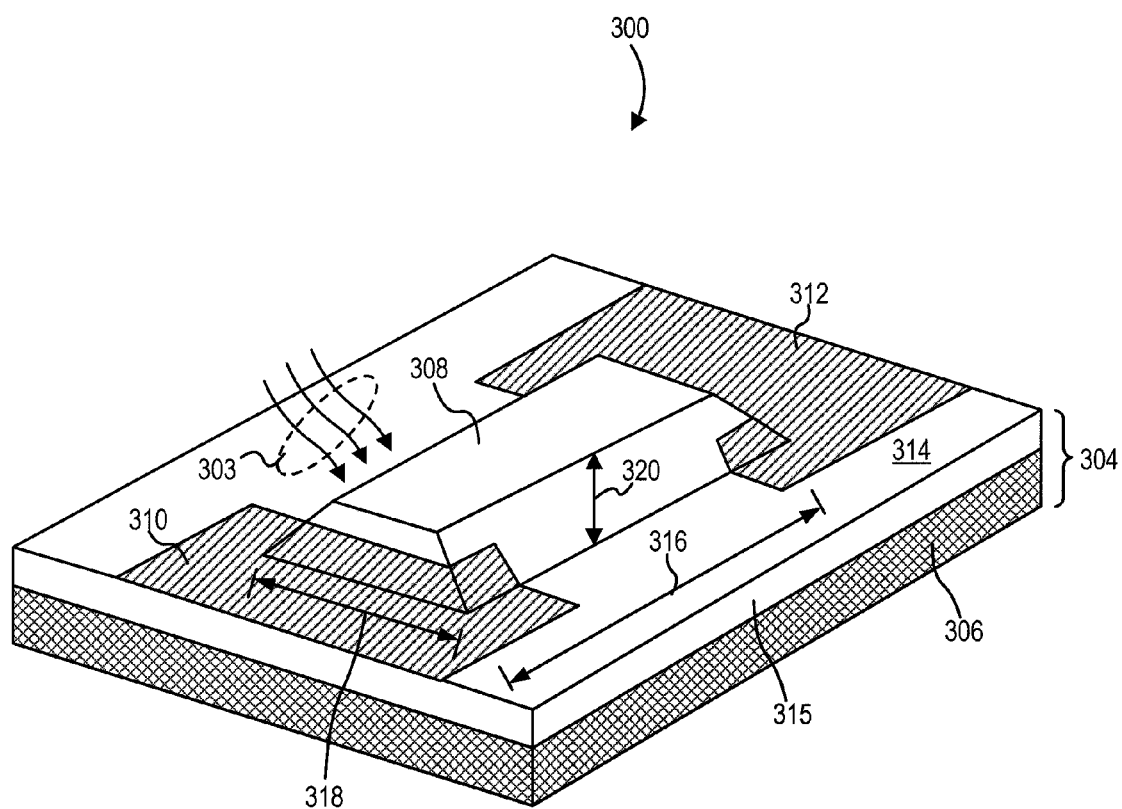
FIG. 6 illustrates one detector that may be used in an optical sensor for detecting changes in incident optical radiation, according to an embodiment.

FIG. 6 illustrates one detector 300, which may be used in an optical sensor for detecting changes in incident optical radiation 303. Detector 300 includes a photoconductive active area 308 formed on a surface 314 of an insulating substrate 304. Active area 308 is formed of a group IV semiconductor. For example, active area 308 may be formed of silicon. In an embodiment of detector 300, active area 308 has a base length 316 of about 80 micrometers, a base width 318 of about 15 micrometers, and a thickness 320 of about 7.5 micrometers, but need not be limited to these dimensions.

Surface 314 of substrate 304 has a high electrical resistivity. Substrate 304 may include a layer 306 formed of a semiconductor (e.g., silicon) and a layer 315 formed of an insulator (e.g., silicon dioxide), where layer 315 forms surface 314. For example, substrate 304 may include layer 306 formed of silicon and layer 315 formed of silicon dioxide on layer 306. However, substrate 304 could include layers in addition to those shown in FIG. 6. Furthermore, substrate 304 could be formed of a single layer of insulating material.

Detector 300 may further include two electrical contacts 310, 312 electrically coupled to active area 308. Electrical contacts 310, 312 provide an electrical interface to active area 308. Electrical contacts 310, 312 are, for example, disposed at opposite ends of active area 308, as shown in FIG. 6. Electrical contacts 310, 312 may be formed of an electrically conductive material, such as a metal. Although detector 300 is illustrated in FIG. 6 as having two electrical contacts 310, 312, detector 300 could have additional electrical contacts, such as to support four point measurements, as discussed below with respect to FIGS. 14A and 14B.

Although detector 300 is illustrated in FIG. 6 as including a single active area 308, detector 300 may include a plurality of active areas 308, such as to form an array of active areas. In embodiments of detector 300 including a plurality of active areas 308, each of the active areas are physically separated from one another to prevent diffusion of carriers between individual active areas 308. See, for example, detector 350 with active areas 308(2)-308(4) or 308(5), shown in FIGS. 23A-23C and described below. Furthermore, detector 300 may have a shape different than that illustrated in FIG. 6. For example, substrate 304 could be formed such that surface 314 is cylindrical, and a plurality of active elements 308 could be disposed on such a surface 314.

Figure 22:
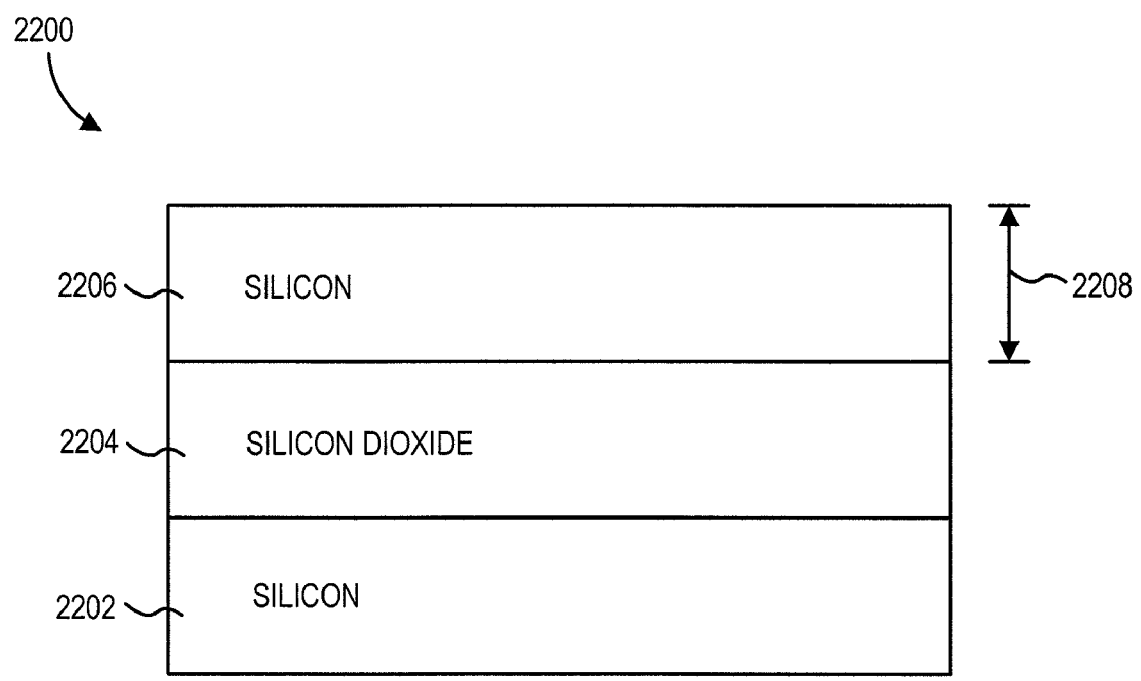
FIG. 22 is a cross sectional view of one silicon on insulator wafer, according to an embodiment.

Detector 300 is, for example, formed from a SOI wafer. FIG. 22 is a cross sectional view of one SOI wafer 2200, which is an example of a wafer that may be used to form detector 300. Wafer 2200 includes a layer 2202 of silicon, a layer 2204 of silicon dioxide disposed on layer 2202, and a layer 2206 of silicon disposed on layer 2204. Layer 2206, for example, has a thickness 2208 ranging from 2 to 10 micrometers. Layer 2206 may be etched to form one or more active areas 308 of silicon.

Wafer 2200 may be formed, for example, by fusion bonding two oxidized wafers of silicon such that the oxidized sides of each wafer adjoin. The silicon side of one of the wafers is then thinned (e.g., such that its thickness ranges from 2 to 10 micrometers). As another example, wafer 2200 may be formed by taking a wafer of silicon and using an ion implantation process to create layer 2204 of silicon dioxide within the wafer.

An embodiment of detector 300 may be, but need not be, formed using the following process. A SOI wafer (e.g., wafer 2200 of FIG. 22) is provided. Active area 308 is defined lithographically on a silicon layer (e.g., layer 2206 of FIG. 22) of the wafer using an oxide mask. Active area 308 is then formed by etching the silicon layer (e.g., layer 2206 of FIG. 22) using a solution of potassium hydroxide. Electrical contacts 310, 312 may be defined lithographically with a lift-off step and are subsequently formed on surface 314 and active area 308.

As discussed above, detector 300 may be used in an optical sensor for detecting changes in incident optical radiation 303. In such applications, detector 300 is, for example, electrically biased using a current source or a voltage source. If detector 300 is biased using a current source (e.g., constant current source or time varying current source), the voltage across active area 308 may be measured using electronics (e.g., an observation instrument such as an oscilloscope and/or a spectrum analyzer), where the change in voltage indicates a change in optical radiation 303 incident on active area 308. If detector 300 is biased using a voltage source (e.g., constant voltage source or time varying voltage source), a load resistor is, for example, connected in series with active area 308. The voltage across the load resistor may be measured using electronics (e.g., an observation instrument such as an oscilloscope and/or a spectrum analyzer), where the change in voltage indicates a change in optical radiation 303 incident on active area 308.

The voltage across active area 308 or a load resistor electrically connected in series therewith may, for example, be analyzed in the time domain and/or in the frequency domain. For example, the voltage across active area 308 or a load resistor connected in series therewith may be analyzed in the frequency domain (e.g., using a spectrum analyzer) if detector 300 is used in an ultrasonic testing application. Such frequency analysis could be used to isolate frequency dominant voltage signals indicating modulation of optical radiation 303 incident on active area 308 due to vibration of an object's surface during ultrasonic testing of the object.

Figure 7:
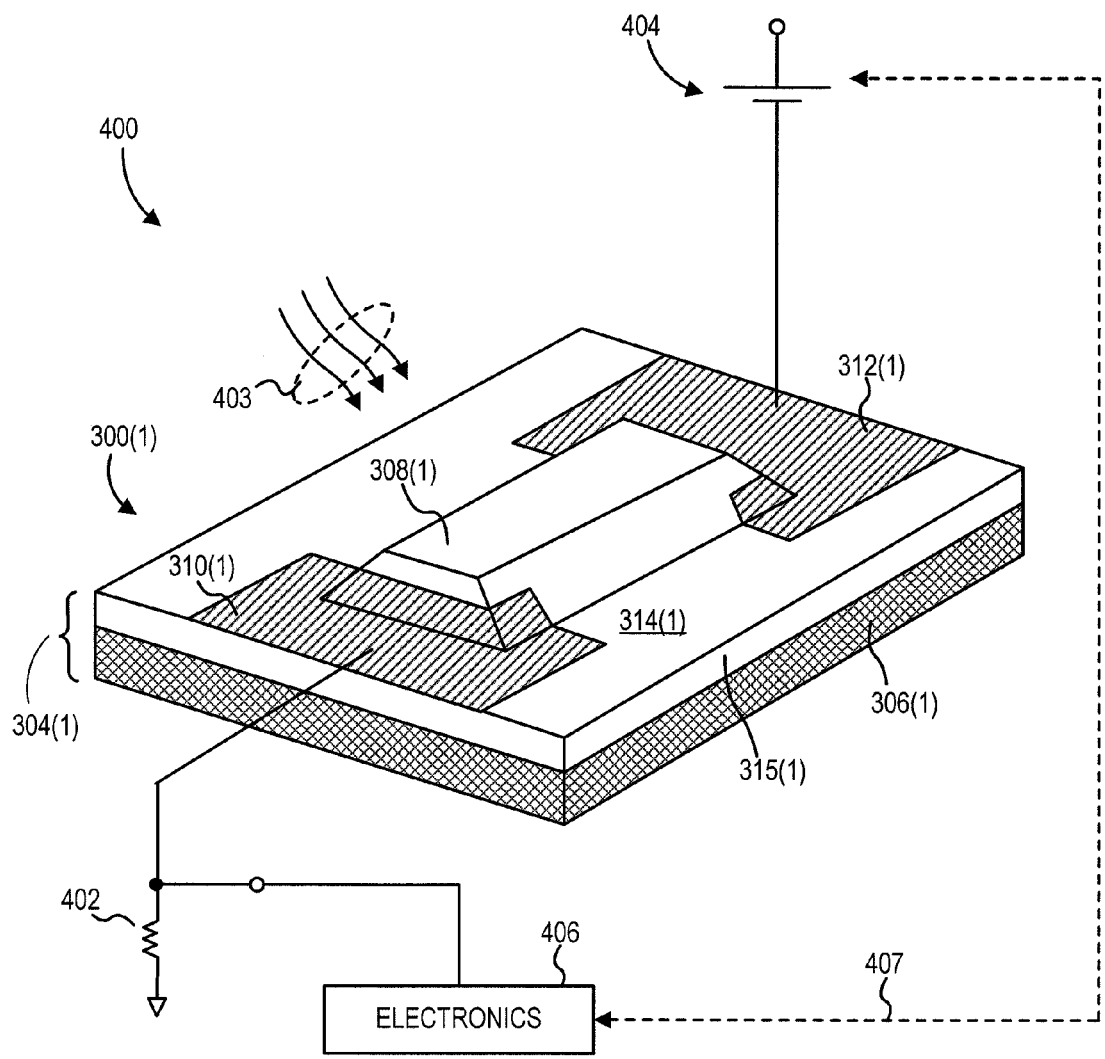
FIG. 7 illustrates one optical sensor for detecting changes in incident optical radiation, according to an embodiment.

FIG. 7 illustrates one optical sensor 400 for detecting changes in incident optical radiation 403. Optical sensor 400 includes detector 300(1), which is an embodiment of detector 300 of FIG. 6. Active area 308(1) is formed of silicon on surface 314(1) of substrate 304(1). Substrate 304(1) includes a layer 306(1) of silicon and a layer 315(1) of silicon dioxide formed thereon.

In optical sensor 400, active area 308(1) is electrically biased by voltage source 404. Voltage source 404 is, for example, a constant voltage source. As another example, voltage source 404 is a time varying voltage source that may be modulated by a periodic waveform (e.g., a square wave) having a desired frequency such that the voltage across active area 308(1) is modulated. Such modulation of voltage source 404 may improve a signal to noise ratio of voltage measurements in optical sensor 400.

Active area 308(1) is electrically connected in series with voltage source 404 and a load resistor 402. Although FIG. 7 illustrates load resistor 402 as being directly connected to electrical contact 310(1), sensor 400 may be configured in a different manner as long as load resistor 402, active area 308(1), and voltage source 404 are electrically connected in series. For example, one or more additional components may be electrically connected in series with load resistor 402, active area 308(1), and voltage source 404.

Load resistor 402 typically has a resistance that is much smaller than the equivalent resistance of active area 308(1). The voltage across load resistor 402 may be measured by electronics 406 (e.g., an oscilloscope, spectrum analyzer, and/or special purpose voltage measuring device) to detect a change in optical radiation 403 incident on active area 308(1). Electronics 406 is optionally connected 407 to voltage source 404 such that electronics 406 controls at least one aspect of the operation of voltage source 404 and/or monitors voltage source 404. In an embodiment, electronics 406 is operable to control modulation of voltage source 404.

Figure 23A:
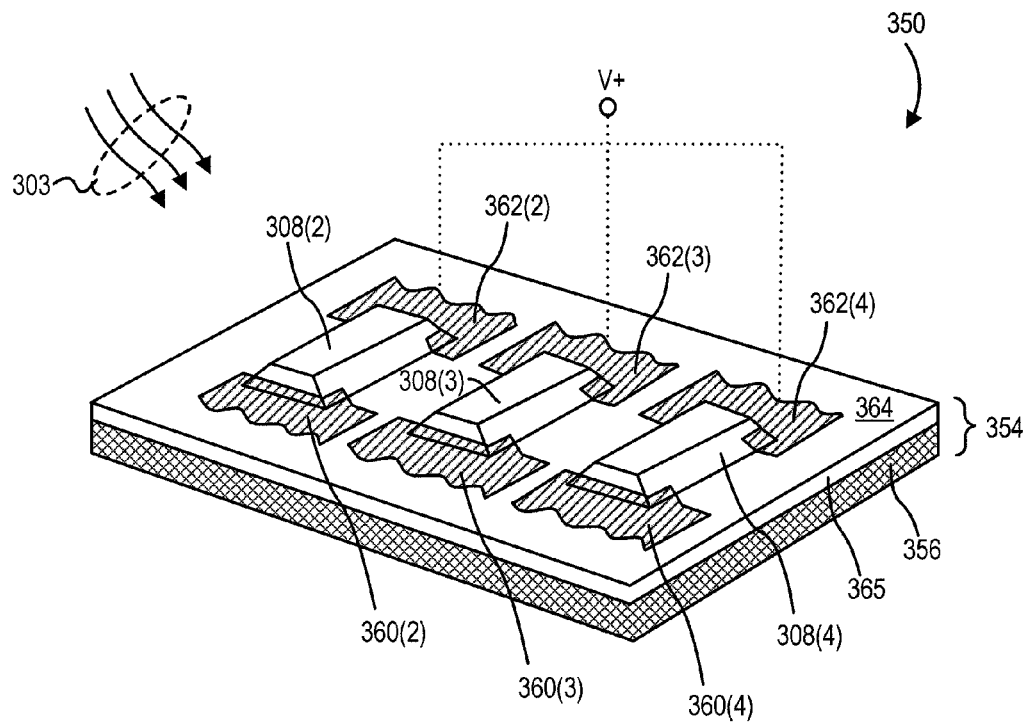
FIG. 23A is a perspective view of a detector including an array of active areas, for detecting changes in incident optical radiation, according to an embodiment.
Figure 23B:
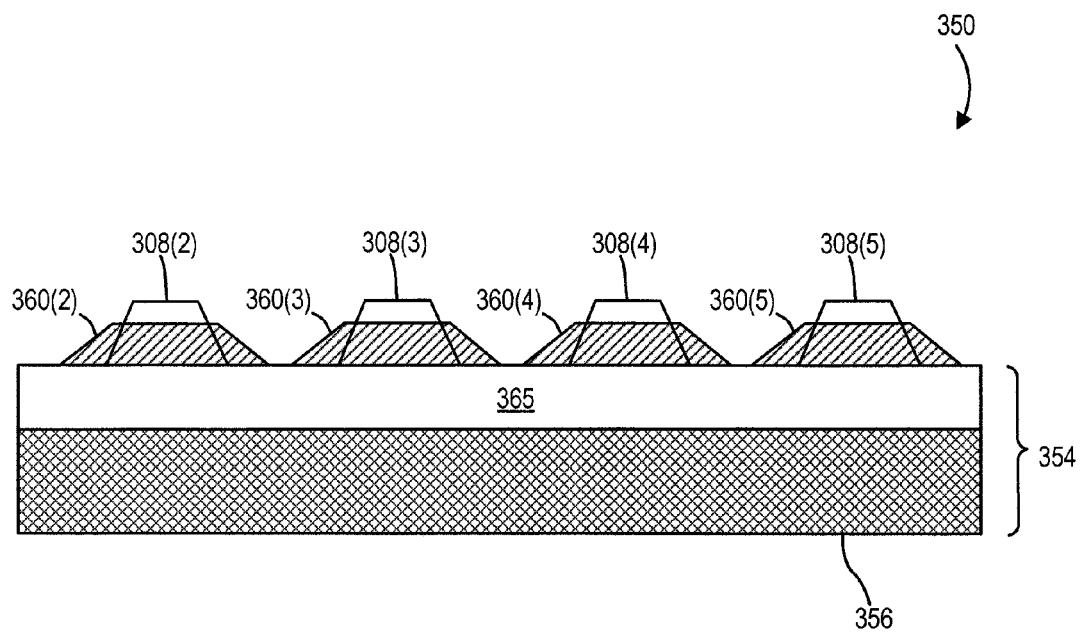
FIG. 23B is a side view of the detector of FIG. 23A, including an additional active area and associated electrical contacts.
Figure 23C:
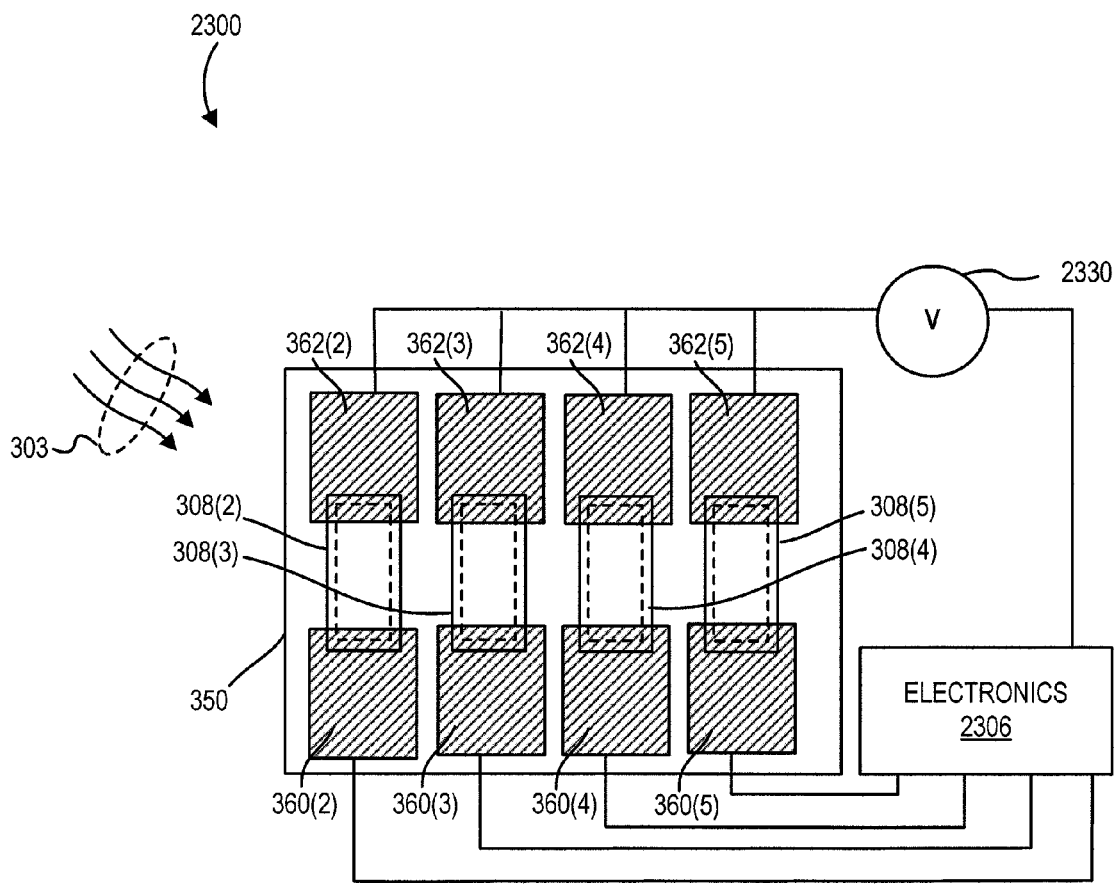
FIG. 23C illustrates an optical sensor incorporating the detector of FIGS. 23A and 23B, according to an embodiment.

As discussed above, a plurality of active areas 308 may be fanned on surface 314 of detector 300 (see, e.g., detector 350 with active areas 308(2)-308(4) or 308(5), FIGS. 23A-23C). Accordingly, embodiments of sensor 400 may include a plurality of active areas 308(1). In such embodiments, each active area 308(1) will have a respective instance of load resistor 402 electrically connected therewith in series. Electronics 406 measures the voltage across at least one instance of load resistor 402. Stated differently, electronics 406 may measure the voltage or current across some or all instances of load resistor 402.

In embodiments of sensor 400 including a plurality of active areas 308(1), each instance of active area 308(1) and its respective load resistor 402 may be biased by a common voltage source 404. Alternately, a plurality of voltage sources 404 (e.g., one voltage source 404 for each active area 308(1) and load resistor 402 pair) may be used to electrically bias the plurality of active areas 308(1) and their respective load resistors 402.

In embodiments of sensor 400 including a plurality of active areas 308(1), the change in voltage across two or more instances of load resistor 402 may be compared to determine spatial characteristics of optical radiation 403 incident on sensor 400. For example, the time rate of change of the voltage across each of two load resistors 402 may be compared, wherein the difference between the two measured time rates indicates spatial characteristics of the optical radiation 403.

Figure 8:
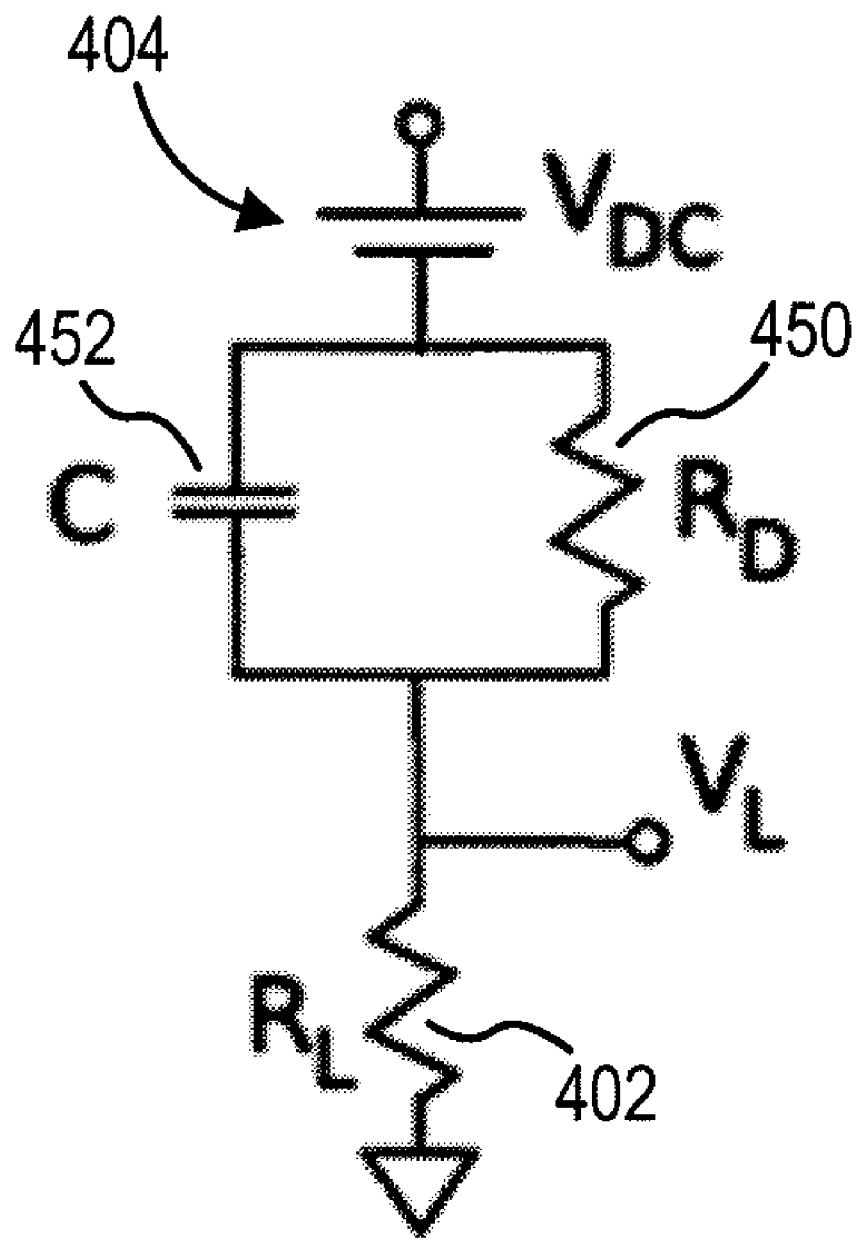
FIG. 8 schematically illustrates a simplified electrical equivalent circuit of the optical sensor of FIG. 7.

FIG. 8 schematically illustrates a simplified electrical equivalent circuit of optical sensor 400, excluding electronics 406. Resistor 450 represents an equivalent of the resistance of active area 308(1); such equivalent resistance is affected by the intensity of optical radiation incident on active area 308 (1). Capacitor 452 represents the parasitic capacitance of active area 308(1).

If the resistance magnitude of load resistor 402 is much less than the magnitude $R_D$ of equivalent resistance $R_L$, the current through load resistor 402 may be approximated by the following second order linear differential equation:

$$\ddot{I} + \left(\frac{\tau + R_L C}{\tau R_L C}\right)\dot{I} + \left(\frac{1}{\tau R_L C}\right)I = \frac{AV}{L\tau R_L C}(\sigma_0 + e\mu\tau G). \quad \text{(Equation 3)}$$

In equation 3, I is the current through load resistor 402, $R_L$ is load resistance 402, C is parasitic capacitance 452, $\tau$ is the effective carrier lifetime in the material of active area 308(1), V is the magnitude of voltage source 404, W is the width of active area 308(1), L is the length of active area 308, $\sigma_o$ is the dark conductivity of the material of active area 308(1), e is the unit charge, $\mu_o$ is the effective carrier mobility of the material of active area 308(1), and G is the carrier generation rate of the material of active area 308(1). Equation 3 has the characteristic of a damped harmonic oscillator ("DHO").

Figure 9:
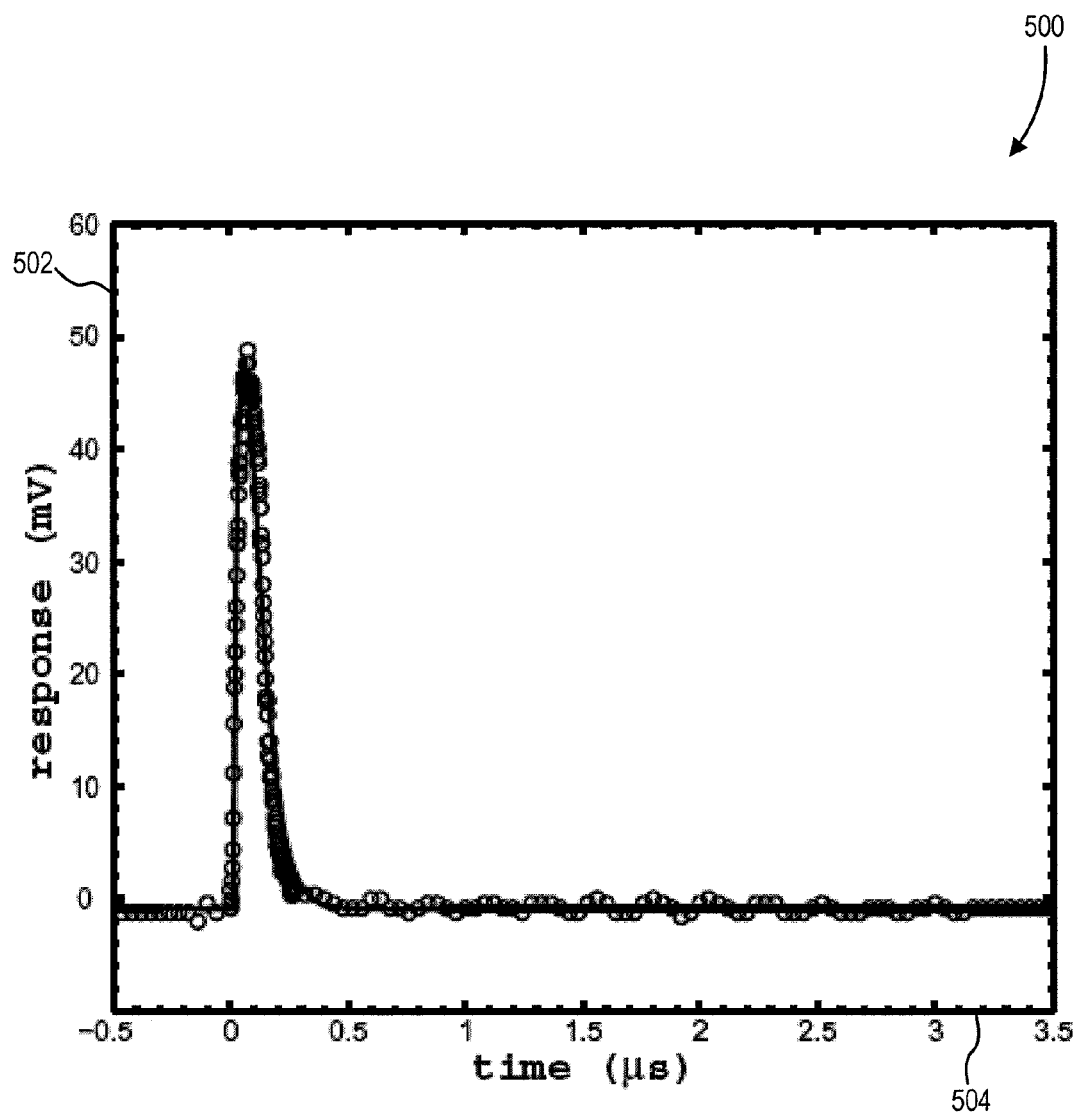
FIG. 9 is a graph of the impulse response of a prototype of the optical sensor of FIG. 7.

Empirical tests were conducted by the present inventors on a prototype of optical sensor 400. One such test was to determine the impulse response of the prototype. In this test, load resistor 402 had a resistance of 120 ohms, and an ultrafast laser pulse was applied to active area 308(1) of detector 300(1). The laser pulse was centered at 800 nanometers and had a full width at half maximum of approximately 40 femtoseconds, a peak intensity of 3.75 megawatts per square centimeter, and a pulse energy per unit area of 150 nanojoules per square centimeter. FIG. 9 is a graph 500 of the impulse response of the prototype of optical sensor 400 under such test conditions. Y-axis 502 represents the voltage across load resistor 402, and x-axis 504 represents time.

The circles on graph 500 represent empirical data points. The DHO response of Equation 3 can then be overlaid as a solid line. As can be observed from FIG. 9, the prototype of optical sensor 400 exhibited DHO behavior in response to the impulse. Such behavior is in part attributable to the finite lifetime of photogenerated carriers in conjunction with parasitic capacitance 452. The effective carrier lifetime of active area 308(1) was estimated from results of steady state measurements to be approximately 300 nanoseconds. Parasitic capacitance 452 was estimated to be approximately 200 picofarads.

Figure 10:
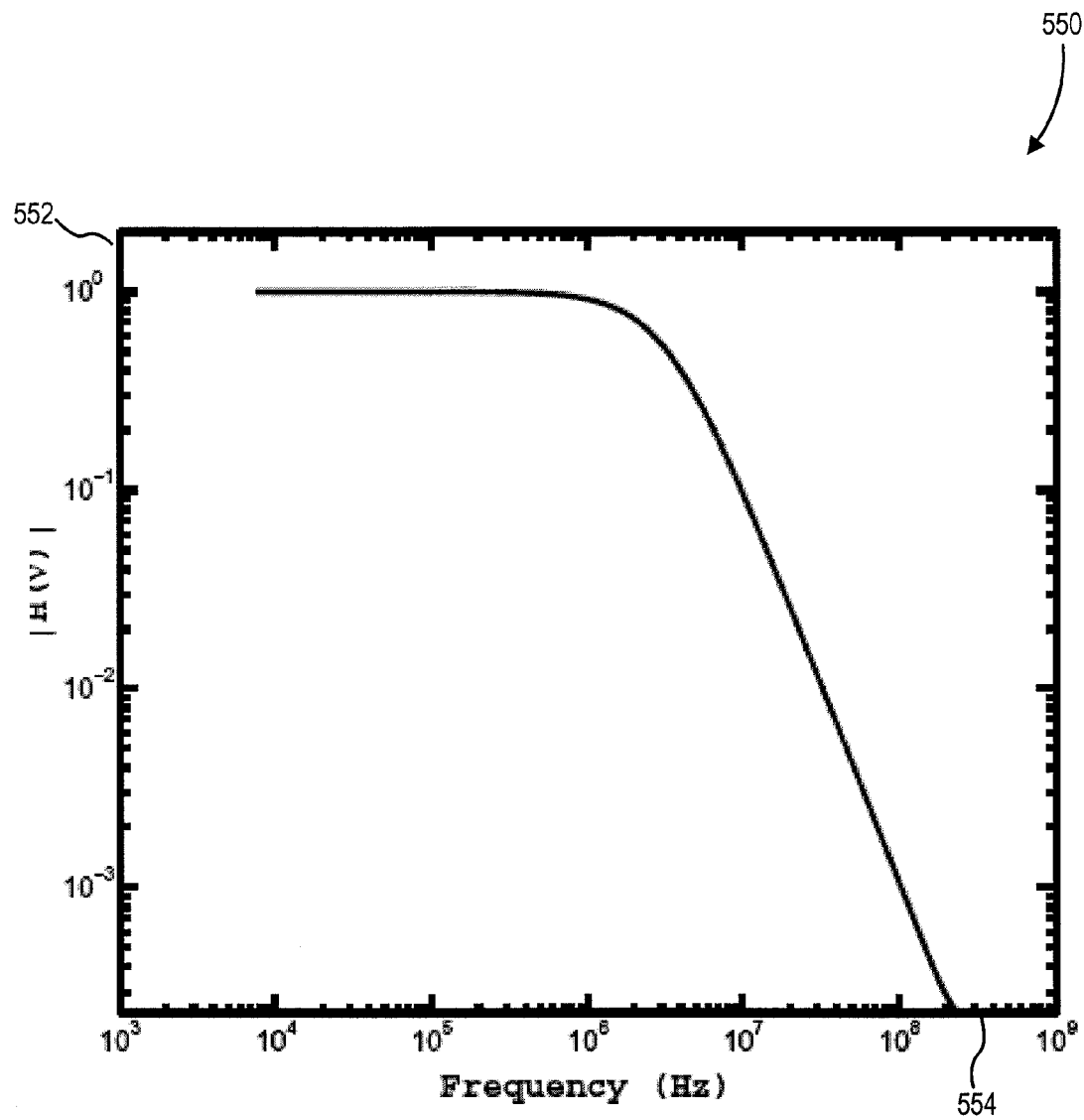
FIG. 10 is a graph of the magnitude of the transfer function of a prototype of the optical sensor of FIG. 7 as a function of frequency.

FIG. 10 is a graph 550 of the magnitude of the transfer function (H) of the prototype of optical sensor 400 during the impulse response test of FIG. 9 as a function of frequency (v). The transfer function is the magnitude of the voltage across load resistor 402 over the intensity of radiation 403 incident on active area 308(1). Graph 550 was obtained by taking the Fourier transform of the DHO overlay curve of FIG. 9. Y-axis 552 represents the magnitude of the transfer function, and x-axis 554 represents frequency in hertz. As can be observed from FIG. 10, the magnitude of the transfer function is essentially flat up to the megahertz frequency range. Accordingly, optical sensor 400 may be suitable to detect changes in illumination at ultrasonic frequencies.

Figure 11:
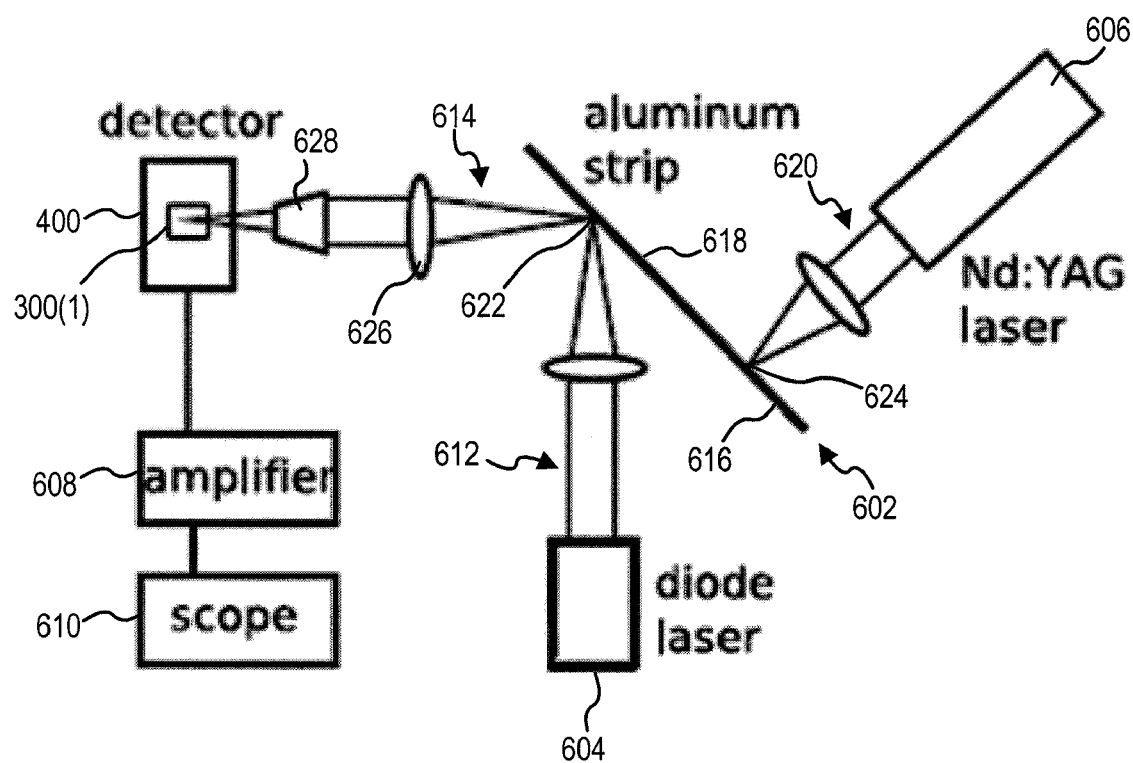
FIG. 11 schematically illustrates a test of a prototype of the optical sensor of FIG. 7.

Another empirical test of the prototype of optical sensor 400 was performed to determine its ability to monitor ultrasonic vibrations. FIG. 11 schematically illustrates how this test was conducted. A laser 604 projected CW laser light 612 onto a point 622 of a surface 616 of an aluminum strip 602. Laser 604 was, in this example, an InGasAs diode laser with a 656 nanometer wavelength. Aluminum strip 602 was formed from a soda can and had dimensions of 100 millimeters, by 5 millimeters, by 0.1 millimeters thick.

Optical sensor 400 detected back scattered light 614 from surface 616 of aluminum strip 602. In particular, back scattered light 614 was collected and focused with a lens 626 and a microscope objective 628 onto active area 308(1) of detector 300(1). (Active area 308(1) is not shown in FIG. 11). The total optical power collected by active area 308(1) was 400 microwatts. The back scattered light incident on active area 308(1) formed an approximately circular spot having about a $1 \times 10^{-4}$ square centimeters radius. Such spot had an intensity of 4 watts per square centimeter.

A laser 606 was used to introduce an ultrasonic pulse in aluminum strip 602. Laser 606 applied a high energy, Q-switched Nd:YAG pulse 620 to a point 624 on a surface 618 of aluminum strip 602, where surface 618 was opposite of surface 616. The pulse from laser 602 had a width of 5 nanoseconds, a spot size of 3 millimeters, and a pulse energy of 20 millijoules. The separation between point 624 and point 622 on aluminum strip 602 was adjustable to provide varying arrival times of the acoustic pulse at point 622.

The voltage across load resistor 402 of the prototype of optical sensor 400 was amplified using amplifier 608. The amplified voltage signal was in turn analyzed using oscilloscope 610.

Figure 12:
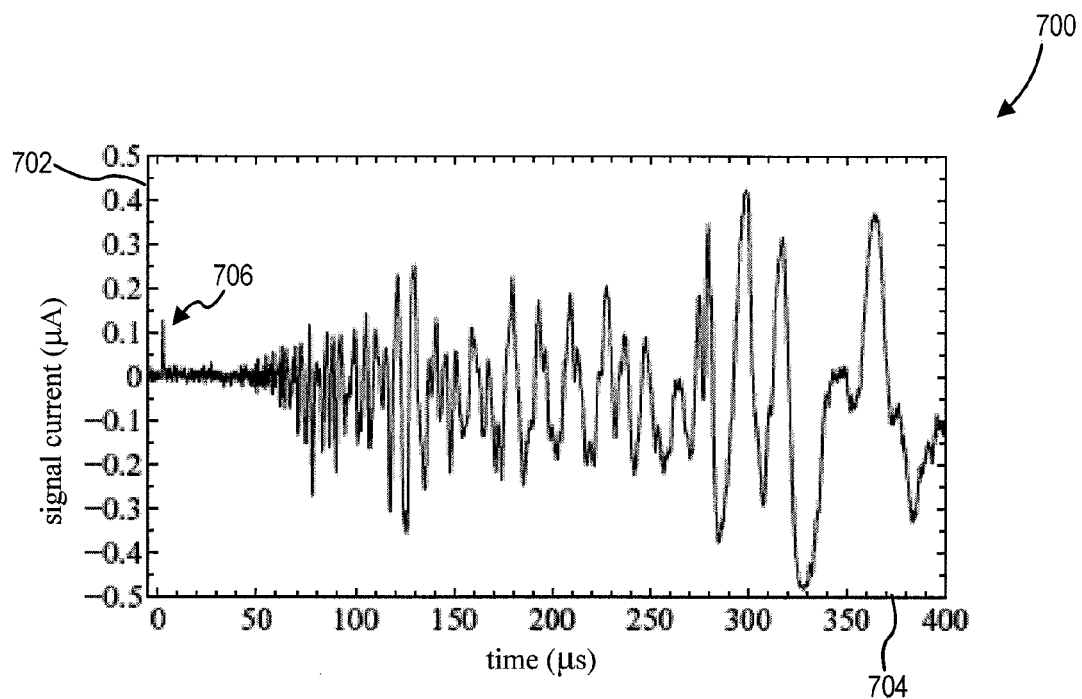
FIG. 12 shows an oscilloscope recording during the test of FIG. 11.

FIG. 12 shows an oscilloscope recording 700 of the current through active area 308(1) during the test of FIG. 11, which was determined by measuring the voltage across load resistor 402. Recording 700 was obtained when the separation between points 624 and 622 on aluminum strip 602 was 7 centimeters. Y-axis 702 corresponds to the magnitude of current through active area 308(1), and x-axis 704 corresponds to time. A time of zero corresponds to the start of generation of the acoustic pulse by laser 606—this generation of the pulse corresponds to the spike 706 in current at time zero.

As can be observed from FIG. 12, after about 30 microseconds, the first high frequency components of the acoustic pulse in aluminum strip 602 begin to appear. Such initial pulses are followed by oscillations of generally decreasing frequency and greater amplitude.

Figure 13:
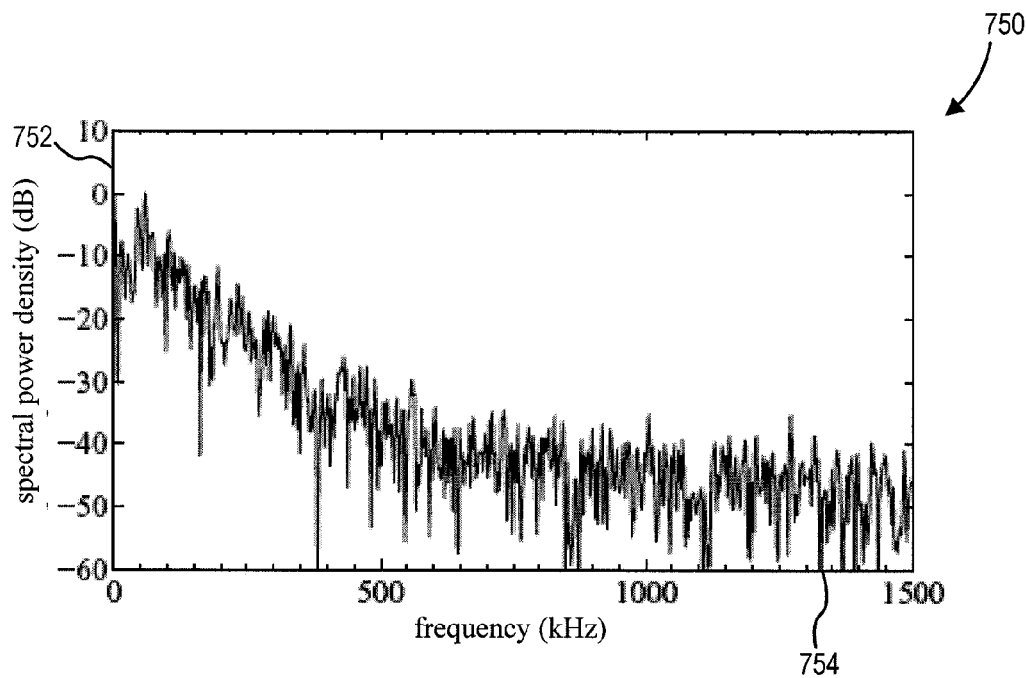
FIG. 13 is a graph of the spectral analysis of the oscilloscope recording of FIG. 12.

FIG. 13 is a graph 750 of the spectral analysis of the oscilloscope recording of FIG. 12. Y-axis 752 corresponds to spectral power density, and x-axis 754 corresponds to frequency. As can be observed from FIG. 13, the ultrasonic pulses provide significant contributions to the current through active area 308(1) up to a frequency of around 500 kilohertz, thereby confirming the ability of optical sensor 400 to detect ultrasonic pulses.

Figure 14A:
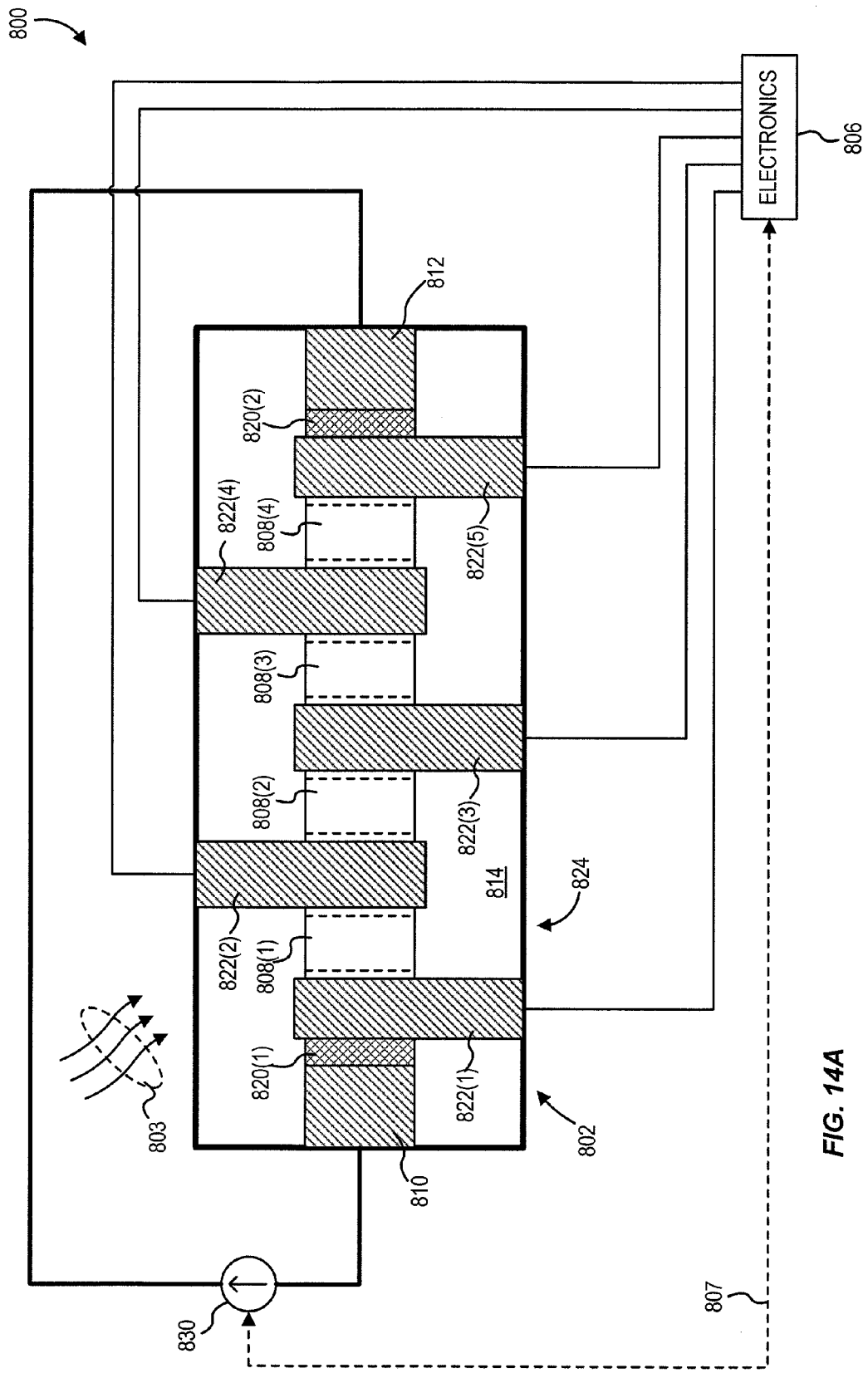
FIG. 14A illustrates one optical sensor for detecting changes in incident optical radiation, according to an embodiment.

FIG. 14A is a top plan view of one optical sensor 800 for detecting changes in incident optical radiation 803. Optical sensor 800 advantageously supports a variation of four point measurement, as discussed below.

Figure 14B:
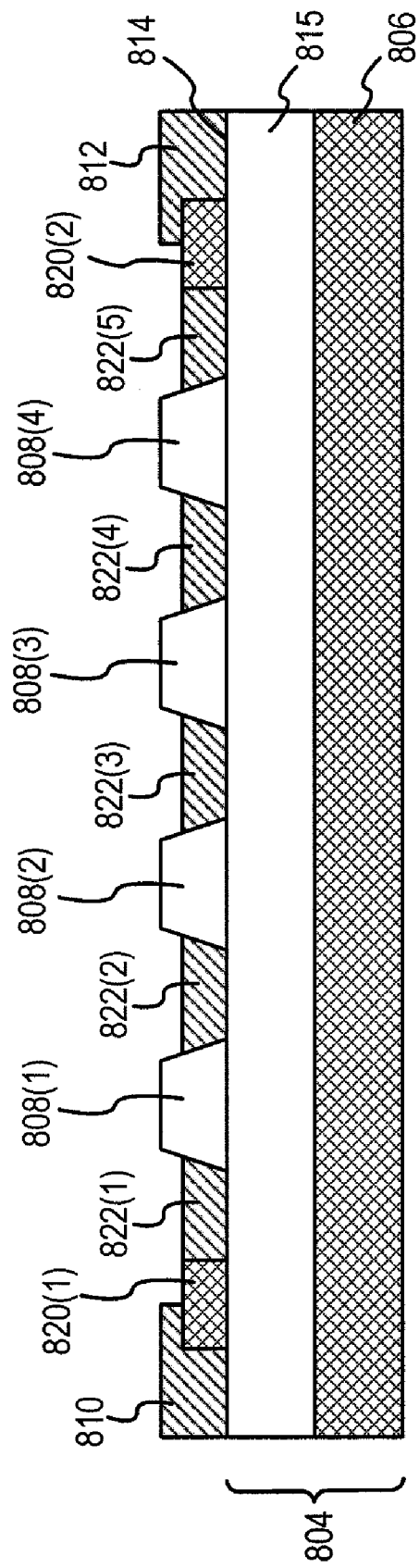
FIG. 14B is a side plan view of a detector of the optical sensor of FIG. 14A.

Optical sensor 800 includes a detector 802, which is an embodiment of detector 300 of FIG. 6. FIG. 14B is a plan view of side 824 of detector 802. Detector 802 includes an insulating substrate 804 with a surface 814 having a high electrical resistivity. Surface 814 is formed, for example, by a layer 815 of an insulating material (e.g., silicon dioxide) disposed on a layer 806 of a semiconductor (e.g., silicon).

Detector 802 includes one or more active areas 808 formed on surface 814. Active areas 808 are an embodiment of active area 308 of detector 300. Active areas 808 are, for example, formed of silicon. FIG. 14A illustrates detector 802 as including four active areas 808. However, detector 802 can have any quantity of active areas 808, including only one active area 808. Active areas 808, for example, have a cross-sectional trapezoidal shape, as illustrated in FIG. 14B. The dashed lines within active areas 808 of FIG. 14A indicate the boundaries of the top surfaces of the trapezoids forming active areas 808.

Detector 802 includes electrical contacts 810, 812 for driving a current through the one or more active areas 808 of detector 802. Such current is provided, for example, by a current source 830 as illustrated in FIG. 14A. Current source 830 is, for example, a constant current source. As another example, current source 830 is a time varying current source that may be modulated by a periodic waveform (e.g., a square wave) having a desired frequency such that the current through active areas 808 is modulated. Such modulation of current source 830 may improve a signal to noise ratio of voltage measurements in optical sensor 800.

Detector 802 includes at least two additional electrical contacts 822 for measuring the respective voltage across each instance of active area 808. Electrical contacts 822 are, for example, electrically coupled to opposing ends of each instance of active area 808. In the example of FIGS. 14A and 14B, electrical contacts 822 enable measurement of the voltage across respective instances of active areas 808 as follows: (i) the voltage may be measured across active area 808(1) via electrical contacts 822(1) and 822(2); (ii) the voltage may be measured across active area 808(2) via electrical contacts 822(2) and 822(3); (iii) the voltage may be measured across active area 808(3) via electrical contacts 822(3) and 822(4); and (iv) the voltage may be measured across active area 808(4) via electrical contacts 822(4) and 822(5).

Detector 800 further includes active areas 820 formed of a semiconductor or resistive material, which active areas 820 are not used to detect optical radiation. For example, active area 820(1) separates electrical contact 810 from electrical contact 822(1), and active area 820(2) separates electrical contact 822(5) from electrical contact 812. Such separation enables four point measurement in optical sensor 800. Active areas 820(1) may be, but need not be, formed of the same semiconductor material (e.g., silicon) as active areas 808.

The voltage across at least one instance of active area 808 is measured via electrical contacts 822 using electronics 806 (e.g., an oscilloscope, spectrum analyzer, and/or special purpose voltage measuring device). For example, FIG. 14A shows electronics 806 being configured to measure the voltage across each instance of active area 808. The change in voltage across each instance of active area 808 indicates a change in optical radiation 803 incident on each such instance. In optical sensor 800, the parasitic impedance of electrical contacts 810, 812, used to inject current through active areas 808, advantageously does not affect the measurement of voltage across active areas 808. However, current will flow through electrical contacts 822 that are also used to measure voltage across active areas 808. Accordingly, optical sensor 800 may be considered to support a variation of four point measurement.

Electronics 806 is optionally connected 807 to current source 830 such that electronics 806 controls at least one aspect of the operation of current source 830 and/or monitors current source 830. In an embodiment, electronics 806 is operable to control modulation of current source 830.

In embodiments of sensor 800 including a plurality of active areas 808 (e.g., the embodiment of FIG. 14A), the change in voltage across two or more instances of active area 808 may be compared to determine spatial characteristics of optical radiation 803 incident on sensor 800. For example, the time rate of change of the voltage across two instances of active area 808 may be compared, wherein the difference between the two measured change rates indicates spatial characteristics of the optical radiation.

Figure 15:
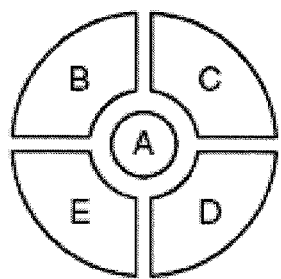
FIG. 15 and FIG. 15A illustrate exemplary arrangement of electrodes and active area for a detector.
Figure 15A:
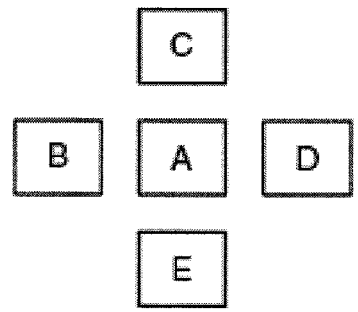

Although electrodes/contacts and active areas in FIGS. 1, 3, 6, 14A, and 14B are configured in a collinear fashion, collinearity is not required. For example, alternative contact configurations are shown in FIG. 15 and FIG. 15A. In FIGS. 15 and 15A, the photosensitive active area is denoted as A, current is injected through electrodes B and D, and voltage is measured across monitoring electrodes C and E. Electrodes B, C, D, E are, for example, then electrically connected as shown in FIG. 1. For example, detector 14 of FIG. 1 could be configured as illustrated in FIG. 15 such that active area 20 would be positioned at area A, electrodes 24, 26 positioned at areas B, C, respectively, and electrodes 30, 28 positioned at areas D, E, respectively. By injecting current through electrodes 24, 30 and by sensing voltage across electrodes 26, 28, changes of incident optical radiation can be detected through active area 20 at area A. As another example, detector 300 of FIG. 6 could be configured such that active area 308 would be positioned at area A, electrical contacts 310 and 312 would be positioned at areas B and D respectively, and the voltage drop across active area 308 can be measured across electrodes C and E.

The material or connectivity between elements A, B, C, D, E should permit current flow from electrode B to D, and through area A, and also permit measurement of the voltage drop across element A. In one configuration, this material comprises the same photoconductive substrate forming area A (such as in FIG. 1). In one embodiment, trenches (not shown) may be formed (e.g., by etching) between B, C, D, E to ensure that current flows only through active region A and not directly between electrodes B, C, D, E. Other techniques may be used to provide like function, for example disposing a resistive, insulating material between electrodes B, C, D, E and active area A. Those skilled in the art appreciate that active area A may comprise multiple active areas, such as areas 52 of FIG. 3.

There is also no requirement that all electrodes B, C, D, E be in the same plane. In one example, it may be preferable for manufacturing, for sensitivity, and/or for 2D or 3D detector arrays, to have sensing electrodes C, E and/or injecting electrodes B, D in one or more planes that are above and below the plane of active area A. By analogy, electrodes 54, 56 of detector 51, FIG. 3, may also be positioned in different planes or locations, as a matter of design choice. Moreover, active areas such as area A, areas 52 (FIG. 3), area 308 (FIG. 6), and/or areas 808, 820 (FIGS. 14A, 14B) may also be positioned to form, for example, two-dimensional or three-dimensional detection arrays, as a matter of design choice.

In one embodiment, one or more epitaxial thin films may be grown on a substrate for the active areas (e.g., areas 52, FIG. 3) and/or the electrodes (e.g., electrodes 54, 56, FIG. 3). Epitaxial thin films may for example help increase optical absorption and/or keep carriers from diffusing into the substrate. Certain materials can be manufactured only in thin film form, such as InGaAs. By tailoring these thin films onto the active areas, a detector (e.g., detector 51) may also preferentially detect certain wavelengths or wavebands.

Figure 16:
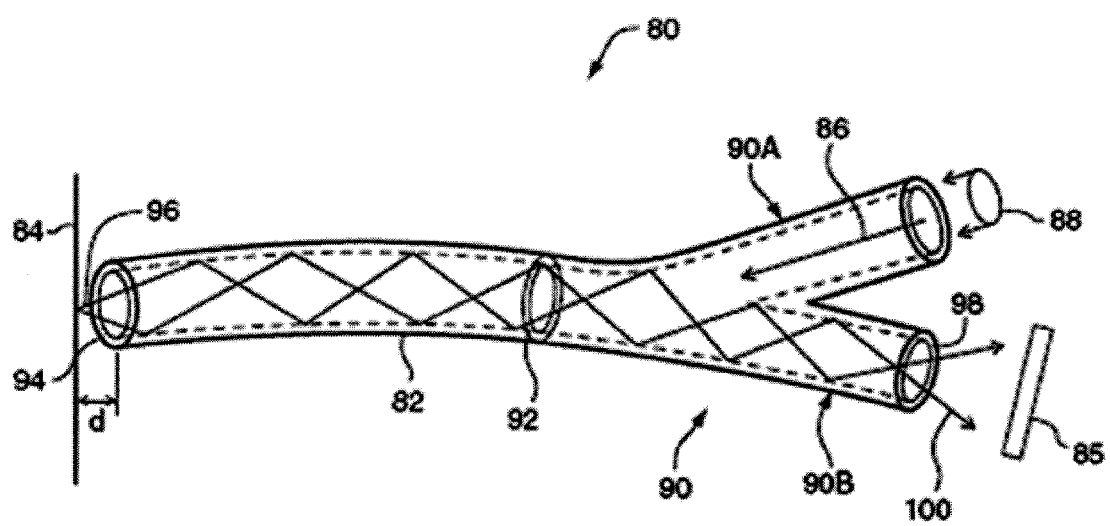
FIG. 16 shows an illustrative illumination arrangement using a multimode optical fiber, to monitor an object with a detector.

FIG. 16 shows an illustrative illumination arrangement 80 using a multimode optical fiber 82 to monitor a surface 84 with a detector 85 (e.g., detector 14 of FIG. 1, detector 51 of FIG. 3, detector 300 of FIG. 6, detector 802 of FIGS. 14A, 14B, or detector A of FIG. 15, 15A). Optical radiation 86 is generated by a laser or LED 88; radiation 86 enters one arm 90A of multimode fiber power splitter 90, which couples to multimode mode fiber 82 through a coupler or splice 92. An end 94 of fiber 82 is placed a small distance d away from the rough surface area of surface 84 to be monitored. Optical radiation 86 that reflects from surface 84 will exhibit time-varying changes if surface 84 vibrates, if fiber 82 moves across surface 84, or if distance d changes (e.g., through tilt or movement of surface 84). This reflected radiation 96 is also collected by multimode fiber 82 through end 94, and interferes with optical radiation 86 that reflects from the air-glass interface at fiber end 94. The two interfering optical signals mix within multimode fiber 82 such that some of this mixed signal 100 emits from a fiber end 98 of another arm 90B of splitter 90, for detection by detector 85. The multimode interference pattern that illuminates detector 85 is time-varying in accordance with the movement of surface 84 (or end 94 or d). The use of fiber 82, 90 enables the measurement to reach surface 84 hidden from view, for example if surface 84 corresponds to a surface of a tooth. It also provides an opportunity to capture a large fraction of light scattered from surface 84 without the use of bulky optics. The function of fiber power splitter 90 may be implemented with classical non-fiber optics ("bulk optics") as a matter of design choice. Multimode fiber 82 may be replaced with a single mode fiber in certain applications. It is thus apparent that the geometry shown in FIG. 16 may be generalized to an array. That is, an array of fibers 82 may be used to illuminate surface 84; in such a case, the optical sensor utilizes an array of detectors 85 (e.g., detector 51 with an array of elements 52, FIG. 3 or detector 802 with array of active areas 808, FIGS. 14A, 14B) designed to spatially match the fiber array (alternatively, an array of optical sensors, each with one or more detectors 85, may be employed wherein the detectors again spatially match to the array of fibers, to provide like detection from the array of fibers).

Figure 17:
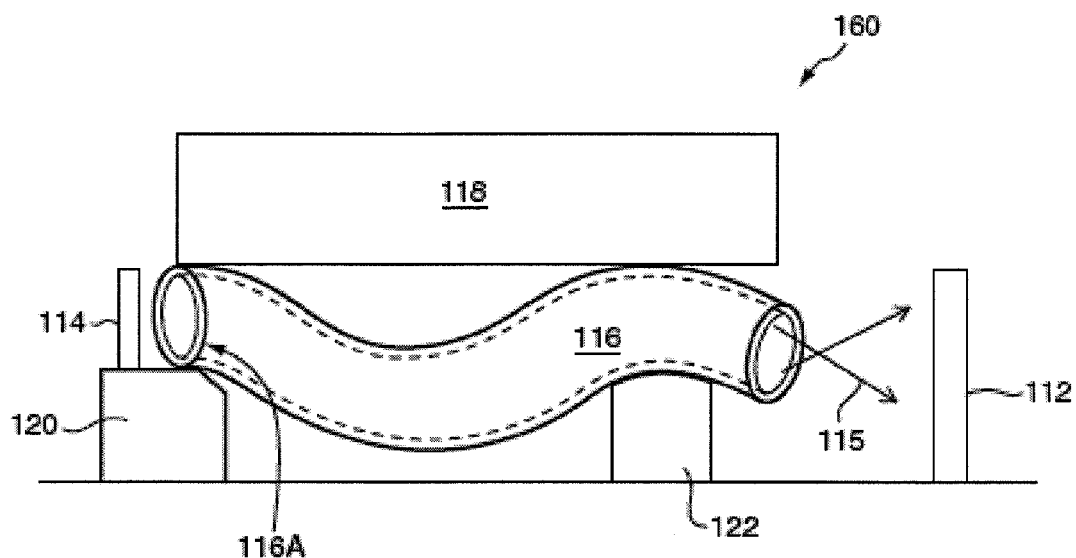
FIG. 17 shows one multimode fiber optic sensor.

FIG. 17 shows one multimode fiber optic system 160, which includes an optical sensor 112 (e.g., sensor 10 of FIG. 1, sensor 50, FIG. 3, sensor 400 of FIG. 7, sensor 800, FIG. 14A), a laser or LED 114, and a multimode optical fiber 116. Sensor 112 operates to detect perturbations of fiber 116—for example caused by a weight 118 lying on fiber 116—by detecting changes in optical radiation 115 from multimode fiber 116. In particular, an end 116A of fiber 116 is illuminated by laser or LED 114. A pair of fiber holders 120, 122 illustratively hold fiber 116 while weight 118 perturbs fiber 116; the perturbation changes the multimode interference pattern within fiber 116 that illuminates optical sensor 112 with radiation 115. The varying pattern thus enables sensing of the presence of weight 118.

It should be apparent that sensor 110 similarly works for other causes of fiber perturbation—such as pressure, temperature, magnetic field, electric field and/or the presence of chemicals—in place of weight 118. For example, when fiber 116 is in the configuration of a coil of fiber, placement of a human hand adjacent to fiber 116 (and not necessarily in contact with fiber 116) causes changes in the multimode pattern, which in turn is detected by optical sensor 112. It is thus apparent that the single laser or LED 114 and fiber 116 may comprise an array of lasers or LEDs 114, matched to an array of fibers 116, matched to optical sensor 112 configured as an array (e.g., with a detector 51 employing an array of active areas 52, or an array of sensors 50, or with a detector 300 employing an array of active areas 308, or with an array of sensors 112, each with one or more active areas).

It should also be apparent (from reading this disclosure) that optical sensor 112 can be used to sense output of fiber 116, resulting from input laser or LED 114, even when there is no source 118 of perturbation, such as within a communication system. A particularly useful configuration for optical sensor 112 is when it is employed or configured as a two-dimensional or three dimensional array, with fiber 116 replaced by a matching array of fibers, and LEDs 114 being replaced by an array of lasers or LED's. The optical sensor 112 in this configuration spatially matches the array of fibers and is more robust, for example, than the photodiode arrays used today in the prior art.

Figure 18:
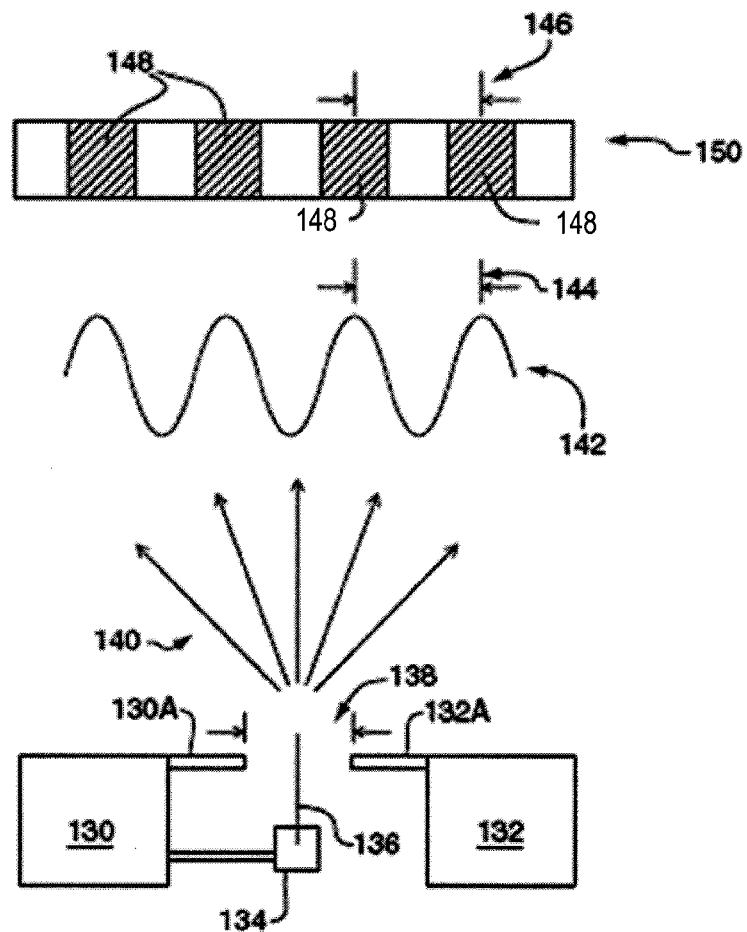
FIG. 18 schematically illustrates one illustrative method of alignment using a periodic mask and a detector.

Certain of the detectors described herein may function as a spatial filter, such as illustrated and discussed now in connection with FIG. 18. When the fringe spacing of an interference or diffraction pattern matches the detector spacing in the array, a large signal from each element results for certain spatial frequencies of the pattern (other frequencies may not be detected, for example frequencies with constructive and destructive parts of the pattern within a single active area). This selective frequency detection can be used to align two objects. If the objects are designed to form an aperture of a certain width when correctly aligned, then a light source can be placed behind this aperture and a detector array sensitive to the appropriate spatial frequencies can be placed in front of the aperture. As the objects are brought closer together, the sensor output increases until an optimal position is achieved. Because the spatial frequency of a diffraction pattern is very sensitive to aperture size, precise alignments are possible. An interferometer may be employed to achieve the same effect. These methods are for example useful in the alignment of masks in photolithography.

FIG. 18 shows an illustrative example of these methods, to enable precise alignment of two objects 130 and 132. A laser 134 generates a laser beam 136 that illuminates a small gap 138. The interaction between laser beam 136 and gap 138 generates diffracted light 140 that forms a diffraction pattern 142 with distinct spatial frequencies 144. When gap 138 has just the right size, diffraction pattern 142 matches the spacing 146 between active areas 148 of a detector 150 (e.g., detector 14 of FIG. 1, detector 50 of FIG. 3, an embodiment of detector 300 of FIG. with a plurality of active areas), then a large signal may result (confirming the desired gap size). Illustratively, object 130 has an attached knife-edge 130A; laser 134 may also attach to object 130, if desired, while it emits beam 136. Object 132 also illustratively has an attached knife-edge 132A. As object 130 is brought closer to object 132, the two knife-edges 130A and 132A form aperture 138 of a particular width. As noted, when the width is small enough, laser beam 136 diffracts past aperture 138, resulting in diffraction pattern 142 characterized by fringe spacing 144 (which depends on the aperture width and, thereby, on the relative spacing between objects 130 and 132). Pattern 142 is incident upon detector array 150, designed such that spacing 146 matches fringe spacing 144 under correct alignment conditions. Identical output from all active elements 148 indicates proper alignment. Similarly, since detector 150 is detecting relative motion between objects 130, 132, the output from detector 150 may further indicate tracking and/or an angular relationship (and not just alignment) between objects 130, 132.

In an alternative arrangement, fringes 142 may be produced by interference rather than through single-slit diffraction of gap 138. That is, objects 130, 132 may be formed as part of an interferometer to generate a similar pattern 142, which can also be detected by detector 150 (to determine alignment, angular positions and/or tracking of object 130 relative to object 132).

The processing of signals from individual active regions 148 by electronics (e.g., electronics 64, FIG. 3, electronics 406, FIG. 7, or electronics 806, FIG. 14A) may occur through one of several exemplary techniques. For example, one technique is to rectify and sum individual contributions from each active area 148. Summing contributions of positive and negative polarity separately, and then subtracting one from the other, further increases the signal and reduces common-mode noise. In another example, the largest of all signals on an element 148 is selected and monitored. In yet another example, individual contributions from elements 148 may be digitized, to allow extraction of the largest signal and to reduce noise through oversampling on a computer.

Figure 19:
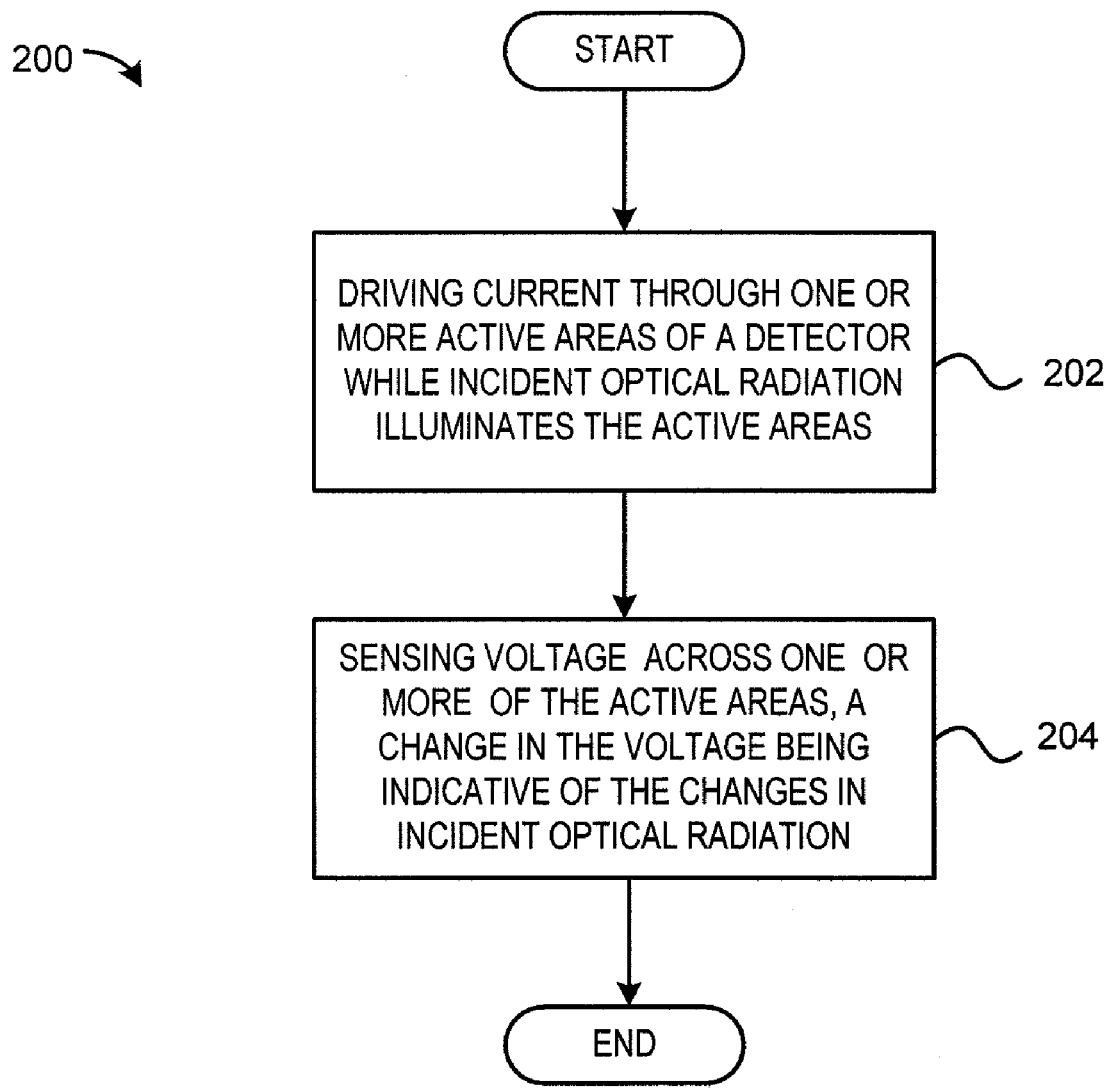
FIG. 19 shows a flow chart of one process of detecting changes in incident optical radiation, according to an embodiment.

FIG. 19 shows one process 200 for detecting changes in incident optical radiation. In step 202, current is driven through one or more active areas of a detector while the incident optical radiation illuminates the active areas. Step 202 is for example performed by source 32, FIG. 1. As another example, step 202 may be performed by using optical sensor 800 of FIG. 14A and driving current through active areas 808 using current source 830. Step 202 does not require constant illumination of the active areas by incident optical radiation, but may for example include motion of incident optical radiation over detector 14 or detector 802 (such as when speckle passes over detector 14, FIG. 1 or detector 802, FIGS. 14A and 14B, respectively). In step 204, voltage is sensed across one or more of the active areas, a change in the voltage being indicative of the changes in incident optical radiation. Step 204 is for example performed by electronics 64, FIG. 3. As another example, step 204 may be performed by measuring the voltage across active areas 808 using electronics 806 (see, FIG. 14). Steps 202, 204 may occur substantially at the same time.

Figure 20:
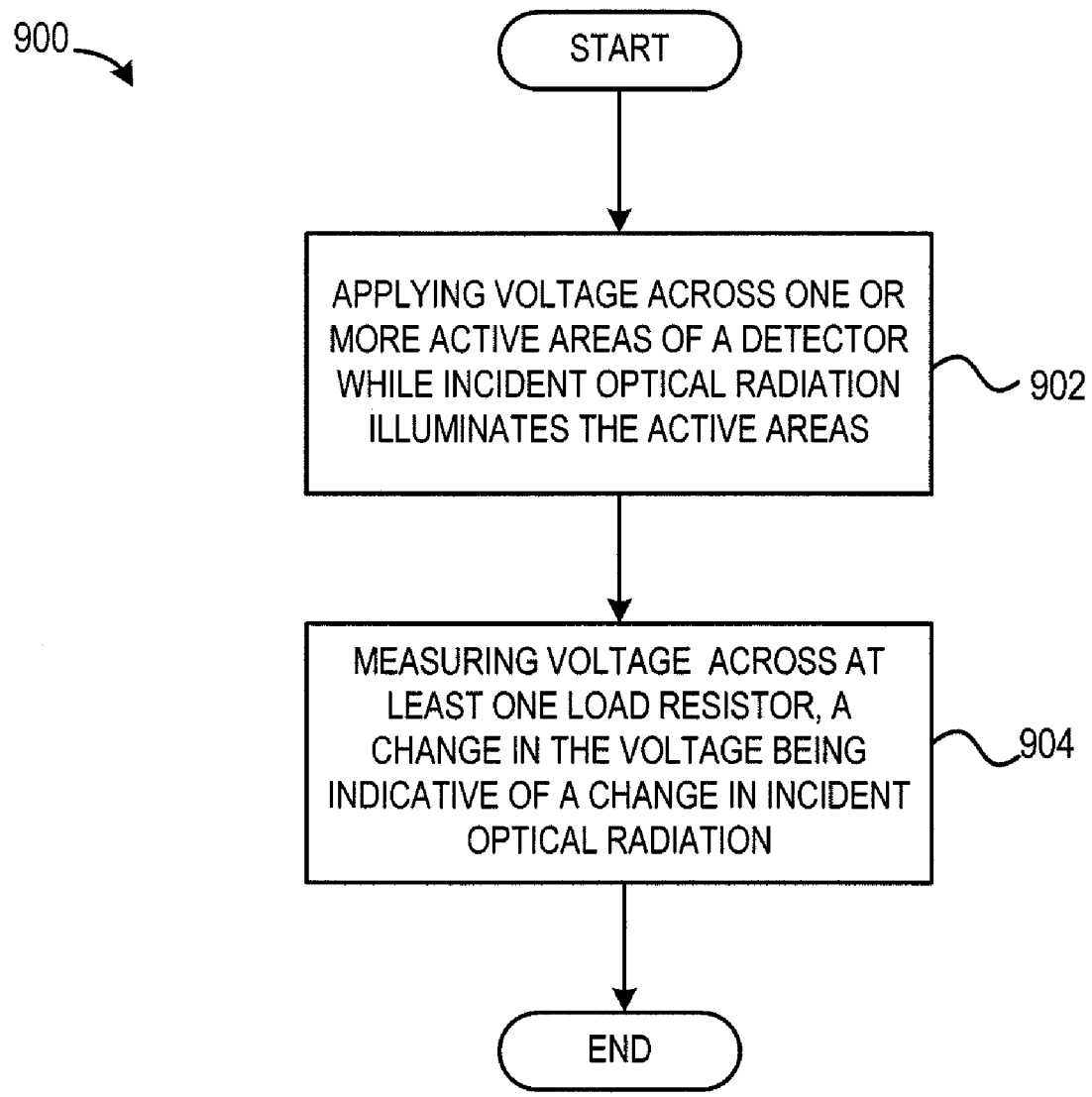
FIG. 20 shows a flow chart of one process of detecting changes in incident optical radiation, according to an embodiment.

FIG. 20 shows one process 900 for detecting changes in incident optical radiation. In step 902, voltage is applied across one or more active areas of a detector while the incident optical radiation illuminates the active areas. Step 902 is, for example, performed by applying voltage across active area 308(1) using voltage source 404 (see, FIG. 7). Step 902 does not require constant illumination of the active areas by incident optical radiation, but may for example include motion of incident optical radiation over detector 300(1) (such as when speckle passes over detector 300(1)). In step 904, voltage is sensed across at least one load resistor, where each load resistor is electrically connected in series with a respective active area. Step 904 is, for example, performed by measuring the voltage across load resistor 402 using electronics 406 (see, FIG. 7). Steps 902, 904 may occur substantially at the same time.

Figure 21:
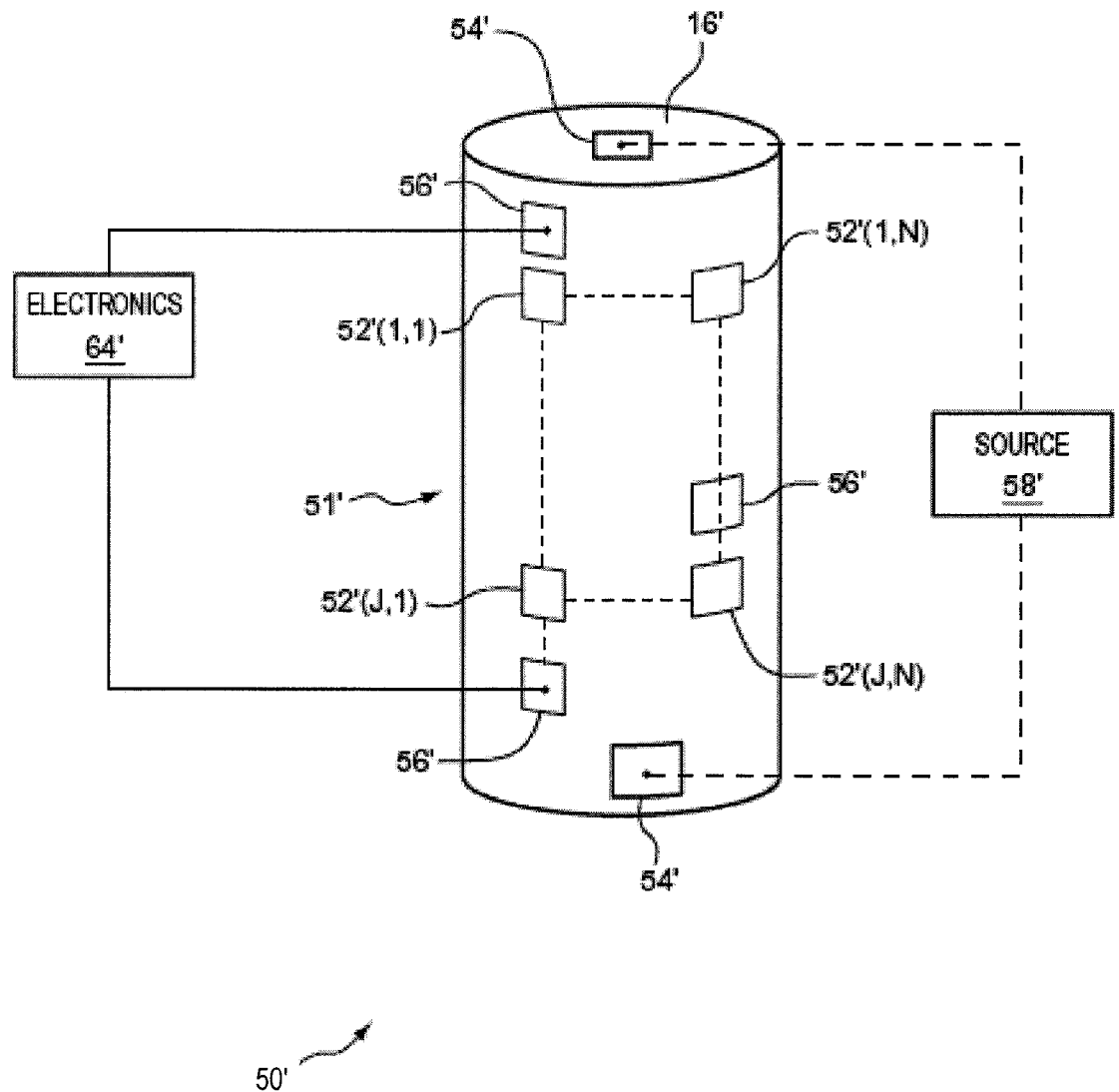
FIG. 21 shows one three-dimensional optical radiation detector, according to an embodiment.

FIG. 21 shows one three-dimensional optical sensor 50' employing an optical radiation detector 51', to illustrate how an array of active areas 52' may be constructed on a photoconductive surface 16' (on a cylindrical substrate, as shown). Active areas 52' are formed by placement of an array of sensing electrodes 56' onto photoconductive surface 16'—for example to provide like function to electrodes 56 and active areas 52 of FIG. 3 (only three electrodes 56' are shown for purposes of illustration). Electronics 64' (e.g., an observation instrument) connects to sensing electrodes 56' to determine voltage drop across active areas 52'. Injecting electrodes 54' are also disposed with photoconductive surface 16' so that current flows across each active area 52' (e.g., through connection to a source 58', e.g., a direct current source), such as injecting electrodes 54 and active areas 52 of FIG. 3. Only two electrodes 54' are shown for purposes of illustration; though more electrodes 54' may be included, if needed or desired. Photoconductive surface 16' in FIG. 21 is arranged on the outside of the cylinder substrate, though other shapes may be formed as a matter of design choice. The array of active areas 52' is illustratively shown as active areas 52'(1,1) . . . 52'(J,N), where J, N are integers corresponding to the desired number of detecting elements for detector 51'.

Since certain changes may be made in the above methods, sensors and systems without departing from the scope hereof, it is intended that all matter contained in the above description or shown in the accompanying drawings be interpreted as illustrative and not in a limiting sense. For example, although the above description often discusses surface motion as the cause for change of incident optical radiation, it should be clear from reading the above disclosure that moving the detector through a stationary illumination pattern may also be employed to determine changes in incident optical radiation, to determine the motion of the detector relative to the means of generating the stationary optical pattern.

FIGS. 23A-23C show a detector 350, and are best viewed together in combination with the following description. Detector 350 represents detector 300 of FIGS. 6 and 7 with a plurality of active areas 308. For example, active areas 308(2), 308(3), 308(4) and 308(5) (the latter shown in FIGS. 23B and 23C) are similar to active area 308 and active area 308(1) of FIGS. 6 and 7, respectively. Turning to FIG. 23A, detector 350 includes a plurality of photoconductive active areas 308(2), 308(3) and 308(4) formed on a surface 364 of an insulating substrate 354. Active areas 308 are formed of a group IV semiconductor. For example, active areas 308 may be formed of silicon. Active areas 308(2)-308(4) may have dimensions corresponding with those given above for active area 308, but need not be limited to these dimensions.

Surface 364 of substrate 354 has a high electrical resistivity. Substrate 354 may include a layer 356 formed of a semiconductor (e.g., silicon) and a layer 365 formed of an insulator (e.g., silicon dioxide), where layer 365 forms surface 364. For example, substrate 354 may include layer 356 formed of silicon and layer 365 formed of silicon dioxide on layer 356. However, substrate 354 could include layers in addition to those shown in FIGS. 23A and 23B. Furthermore, substrate 354 could be formed of a single layer of insulating material.

Detector 350 may further include a pair of individually addressable, current sensing electrical contacts 360, 362 electrically coupled to each active area 308. Electrical contacts 360, 362 provide electrical interfaces to active areas 308 and are, for example, disposed at opposite ends of active areas 308, as shown. Electrical contacts 360, 362 may be formed of an electrically conductive material, such as a metal. Each of active areas 308(2), 308(3) and 308(4) are physically separated from one another to prevent diffusion of carriers therebetween.

Detector 350 is, for example, formed from an SOI wafer such as that shown and described with respect to FIG. 22 and may be formed according to the process described above in connection with FIG. 22.

In one aspect, detector 350 is electrically biased using a current source or a voltage source and is used in an optical sensor for detecting changes in incident optical radiation 303. Voltage is applied across one or more of active areas 308 while radiation 303 illuminates the active areas; and current through active areas 308 is sensed. A change in current indicates a change in optical radiation incident on active area 308.

The current through an active area 308 or a load resistor electrically connected in series therewith may be analyzed in the time domain and/or in the frequency domain. For example, the current through active areas 308(2)-308(4) or load resistors connected in series therewith may be analyzed in the frequency domain (e.g., using a spectrum analyzer) if detector 350 is used in an ultrasonic testing application. Such frequency analysis may be used to isolate frequency dominant voltage signals indicating modulation of optical radiation 303 incident on any or all of active areas 308(2)-308(4) due to vibration of an object's surface during ultrasonic testing of the object.

FIG. 23C shows a top plan view of an optical sensor 2300, including detector 350. Four active areas 308 are shown; however, detector 350 can have any quantity of active areas 308. Active areas 308, for example, have a cross-sectional trapezoidal shape, as illustrated in FIG. 23B. The dashed lines within active areas 308 of FIG. 23C indicate the boundaries of the top surfaces (or mesas) of the trapezoids forming active areas 308.

For each active area 308, detector 350 includes a pair of electrical contacts 360, 362 for applying a voltage thereto. Such voltage may be provided by a source 2330. Current through active area(s) 308 is sensed using electronics 2306. The change in current across each instance of active area 308 indicates a change in optical radiation 303 incident on each such instance. The change in current through two or more instances of active area 308 may be compared to determine spatial characteristics of optical radiation 303 incident on sensor 2300. For example, the time rate of change of the current through two instances of active area 308 may be compared, wherein the difference between the two measured change rates indicates spatial characteristics of the optical radiation.

It is also to be understood that the following claims are to cover generic and specific features described herein, and all statements of the scope which, as a matter of language, might be said to fall therebetween.

We claim:

1. A detector for detecting changes in incident optical radiation, comprising:
    an insulating substrate having a first surface;
    an array of photoconductive active areas formed on the first surface of the insulating substrate, for detecting the incident optical radiation, each active area formed of a group IV semiconductor and having a first surface; and
    for each active area, a pair of electrical contacts mounted on the first surface of the active area and electrically coupled to opposing ends of said each active area, for providing electrical interface to the active area; wherein electrical contacts on first ends of the active areas are independent of electrical contacts on second ends of the active areas.

2. The detector of claim 1, the active areas being formed of silicon.

3. The detector of claim 2, the insulating substrate comprising:
    a layer of silicon, and
    a layer of silicon dioxide formed on the silicon layer, an upper surface of the silicon dioxide layer opposite to the silicon layer forming the first surface.

4. The detector of claim 3, each active area of the array having a first end opposite a second end, a first electrical contact of the associated pair of electrical contacts being electrically coupled to the first end, and a second electrical contact of the associated pair of electrical contacts being electrically coupled to the second end; wherein the first electrical contacts are independent of the second electrical contacts, and wherein each pair of electrical contacts provides a voltage across its associated active area.

5. The detector of claim 1, the active areas of the array being physically separated from one another.

6. The detector of claim 3, the first surface of the insulating substrate being planar.

7. A sensor for detecting a change in incident optical radiation, comprising:
    a detector, including:
        an insulating substrate including:
            a layer of silicon, and
            a layer of silicon dioxide formed on the silicon layer, an upper surface of the silicon dioxide layer opposite to the silicon layer forming a first surface;

a first photoconductive active area formed on the first surface, for detecting the incident optical radiation, the first active area formed of silicon; and a first electrical contact electrically coupled to a first end of the first active area and a second electrical contact electrically coupled to an opposing, second end of the first active area for providing electrical interface with the first active area;

a second photoconductive active area formed of silicon on the first surface, having opposing first and second ends and being physically separated from the first active area, for detecting the incident optical radiation; and a third electrical contact electrically coupled to the first end of the second active area and a fourth electrical contact electrically coupled to the second end of the second active area, for providing electrical interface with the second active area; and electronics for measuring a change in current through the active areas to determine the change in the incident optical radiation;

wherein the first and third electrical contacts are independent of the second and fourth electrical contacts.

8. The sensor of claim 7, wherein output of each active area connects to individually addressable current sensing and processing electronics.

9. The sensor of claim 7, further comprising:
a laser;
a power splitter including an arm; and
an optical fiber coupled to the power splitter,
the laser generating a laser beam into the arm of the power splitter, the laser beam exiting the optical fiber, reflecting off a surface of an object and reentering the optical fiber to interfere with the laser beam within the optical fiber, and
the first and second active areas arranged to detect the interfered laser beam within the optical fiber, a change in current through the first and second active areas indicating motion of the object's surface.

10. The sensor of claim 7, further comprising an optical fiber optically coupled to the first or the second active area.

11. A sensor for detecting a change in incident optical radiation, comprising:
a detector, including:
an insulating substrate including:
a layer of silicon, and
a layer of silicon dioxide formed on the layer of silicon, an upper surface of the silicon dioxide layer opposite to the silicon layer forming a first surface;
an array of photoconductive active areas for detecting the incident optical radiation, the active areas formed of silicon on the first surface of the insulating substrate; and
for each active area, a first and a second electrical contact electrically coupled to opposing first and second ends of the active area, for applying a voltage from a voltage source across the active area; wherein electrical contacts coupled to first ends of the active areas are independent of electrical contacts coupled to second ends of the active areas;
for at least one active area of the array, a load resistor electrically connected in series with the at least one active area, and electronics for measuring a change in voltage across the load resistor, the change in voltage being indicative of the change in the incident optical radiation.

12. The sensor of claim 11, the voltage source being common to each active area of the array and being selected from the group consisting of a constant voltage source and a time varying voltage source.

13. The sensor of claim 11, the electronics being coupled to the voltage source, and being configured to modulate the voltage source so that the voltage applied across each active area is modulated at a desired frequency.

14. The sensor of claim 11, further comprising:
a laser;
a power splitter including an arm; and
an optical fiber coupled to the power splitter,
the laser generating a laser beam into the arm of the power splitter, the laser beam exiting the optical fiber, reflecting off an object's surface, and reentering the optical fiber to interfere with the laser beam within the optical fiber, and wherein
the active areas are arranged to detect the interfered laser beam within the optical fiber, the change in voltage across the load resistor indicating motion of the object's surface.

15. The sensor of claim 11, further comprising an optical fiber optically coupled to the array.

16. A method for detecting a change in optical radiation, comprising the steps of:
applying an electric voltage to at least one of an array of photoconductive active areas via first and second individually-addressable electrical contacts coupled with opposing first and second ends of the at least one active area while the optical radiation illuminates the at least one active area, the active areas formed of silicon on a first surface of an insulating substrate, the insulating substrate including a layer of silicon and a layer of silicon dioxide formed on the silicon layer, an upper surface of the silicon dioxide layer opposite to the silicon layer forming the first surface; and
measuring a current change through the at least one active area, the current change being indicative of the change in the optical radiation.

17. The method of claim 16, the optical radiation reflecting off an object's surface, the change in the optical radiation resulting from a movement of the object's surface, the method further comprising determining motion of the object's surface from the current change across the first active area.

18. The method of claim 16, further comprising:
illuminating an object's surface with a laser having a wavelength that is smaller than defined geometric features of the surface such that moving speckle, indicative of surface motion, illuminates the at least one active area while voltage is applied to the at least one active area; and
determining surface motion from the current change through the at least one active area.

19. The method of claim 18, the step of illuminating the object's surface comprising generating an interference pattern that varies with surface motion.

20. The method of claim 18, the surface motion comprising surface displacement.

21. The method of claim 16, the optical radiation comprising an interference or diffraction pattern dependent upon a distance between two objects, the method further comprising:
detecting changes in the interference or diffraction pattern to align the objects by measuring the current change through the at least one active area, the current change indicating a change in the distance between the objects;
assessing a relative position between the objects; and
aligning the objects according to changes in the interference or diffraction pattern.

22. The method of claim 21, the optical radiation being generated by illuminating a gap between the objects with a laser.

23. The method of claim 21, wherein the step of assessing the relative position comprises assessing relative angles between the two objects, and wherein the current change through the at least one active area indicates a change in an angular relationship between the objects.

24. A method for detecting a change in optical radiation, comprising the steps of:
applying a voltage across an array of photoconductive active areas while the optical radiation illuminates the array, the active areas formed of silicon on a first surface of an insulating substrate, the insulating substrate including a layer of silicon and a layer of silicon dioxide formed on the silicon layer, an upper surface of the silicon dioxide layer opposite to the silicon layer forming the first surface; and
measuring a current change through at least a first active area of the array of photoconductive active areas, the change being indicative of the change in the optical radiation;
wherein applying a voltage across the array comprises utilizing a plurality of first electrodes and second electrodes to apply the voltage across the active areas, each of the first electrodes electrically coupled with a first end of an active area, and each of the second electrodes electrically coupled with an opposing second end of an active area, and wherein the first electrodes are independent of the second electrodes.

25. The method of claim 24, the optical radiation reflecting off an object's surface, the change in the optical radiation resulting from a movement of the object's surface, the method further comprising determining motion of the object's surface from the current change through at least the first active area of the array.

26. The method of claim 24, further comprising:
illuminating an object's surface with a laser having a wavelength that is smaller than defined geometric features of the surface such that moving speckle, indicative of surface motion, illuminates the array while voltage is applied across the active areas; and
determining the surface motion from current change through the first active area.

27. The method of claim 26, the step of illuminating the surface comprising generating an interference pattern that varies with the surface motion.

28. The method of claim 26, the surface motion comprising surface displacement.

29. The method of claim 24, the optical radiation comprising an interference or diffraction pattern dependent upon a distance between two objects, the method further comprising:
detecting changes in the interference or diffraction pattern to align the objects by measuring the current change through at least the first active area, the current change indicating a change in the distance between the objects;
assessing a relative position between the objects; and
aligning the objects according to changes in the interference or diffraction pattern.

30. The method of claim 29, the optical radiation being generated by illuminating a gap between the objects with a laser.

31. The method of claim 29, wherein assessing a relative position comprises assessing relative angles between the two objects, and wherein the current change through at least the first active area indicates a change in an angular relationship between the objects.

32. The method of claim 24, further comprising:
measuring a current change through a separate second active area of the array of photoconductive active areas, and
comparing a time rate of change of the current through the first and second active areas of the array, a difference between the separate time rates being indicative of spatial characteristics of the optical radiation.

33. The detector of claim 1, wherein the opposing ends of each active area are substantially identical.

* * * * *

UNITED STATES PATENT AND TRADEMARK OFFICE
CERTIFICATE OF CORRECTION

| | | |
|---|---|---|
| PATENT NO. | : 8,174,253 B2 | Page 1 of 1 |
| APPLICATION NO. | : 13/032523 | |
| DATED | : May 8, 2012 | |
| INVENTOR(S) | : Elsa Garmire et al. | |

It is certified that error appears in the above-identified patent and that said Letters Patent is hereby corrected as shown below:

Column 8, line 23, "electrodes 24, 26, 28" should read -- electrodes 24, 26, 28, 30 --;

Column 21, line 40, "ther-" should read -- there --; line 41, "ebetween." should read -- between. --;

Column 23, lines 64-65, "active area, and electronics for measuring a change in voltage across the load resistor, the change in voltage" should read
-- active area, and
electronics for measuring a change in voltage across the load resistor, the change in voltage --

Signed and Sealed this
Twenty-fourth Day of July, 2012

David J. Kappos
*Director of the United States Patent and Trademark Office*